(12) United States Patent
Deck et al.

(10) Patent No.: US 9,891,078 B2
(45) Date of Patent: Feb. 13, 2018

(54) INTERFEROMETRIC ENCODERS USING SPECTRAL ANALYSIS

(71) Applicant: Zygo Corporation, Middlefield, CT (US)

(72) Inventors: Leslie L. Deck, Middletown, CT (US); Jan Liesener, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 165 days.

(21) Appl. No.: 14/798,910

(22) Filed: Jul. 14, 2015

(65) Prior Publication Data

US 2016/0011016 A1  Jan. 14, 2016

Related U.S. Application Data

(60) Provisional application No. 62/024,010, filed on Jul. 14, 2014.

(51) Int. Cl.
*G01D 5/34* (2006.01)
*G01D 5/347* (2006.01)
*G01D 5/26* (2006.01)

(52) U.S. Cl.
CPC ......... *G01D 5/34707* (2013.01); *G01D 5/266* (2013.01)

(58) Field of Classification Search
CPC ................... G01D 5/34707; G01D 5/266
See application file for complete search history.

(56) References Cited

U.S. PATENT DOCUMENTS

| | | |
|---|---|---|
| 4,594,003 A | 6/1986 | Sommargren |
| 7,639,367 B2 | 12/2009 | de Groot et al. |
| 8,300,233 B2 | 10/2012 | Deck et al. |
| 2005/0046855 A1 | 3/2005 | Davidson |
| 2007/0024869 A1 | 2/2007 | Ostrovsky et al. |
| 2010/0128280 A1* | 5/2010 | Davidson ........... G01B 11/2441 356/497 |
| 2011/0255096 A1 | 10/2011 | Deck et al. |
| 2012/0249987 A1 | 10/2012 | Vermeulen et al. |
| 2013/0114087 A1 | 5/2013 | Deck |
| 2013/0128275 A1 | 5/2013 | Matsudo et al. |

OTHER PUBLICATIONS

International Preliminary Report on Patentability and Written Opinion of International Application No. PCT/US2015/040373, dated Jan. 26, 2017.

(Continued)

*Primary Examiner* — Hwa Lee
(74) *Attorney, Agent, or Firm* — Fish & Richardson P.C.

(57) ABSTRACT

Determining information about a degree of freedom of rigid body motion of an encoder scale includes: directing a first beam toward an encoder scale, in which the first beam diffracts from an encoder scale; combining a diffracted component of the first beam with a second beam to form an interfering output beam; monitoring changes in the output beam as a function of a wavelength of the first and second beams; and determining the information about a degree of freedom of rigid body motion of the encoder scale based on changes in the output beam as a function of the wavelength.

24 Claims, 16 Drawing Sheets

(56) References Cited

OTHER PUBLICATIONS

International Search Report and Written Opinion of the International Searching Authority for International Application No. PCT/US2015/040373, dated Oct. 28, 2015 (17 pages).
Badami, V., and de Groot, P. "Displacement Measuring Interferometry," [Handbook of Optical Dimensional Metrology], K. G. Harding, Ed., Taylor & Francis, Boca Raton, pp. 158-237, (2013).
Deck, L. L., "Fourier-Transform Phase-Shifting Interferometry," Applied Optics vol. 42, No. 13, pp. 2354-2365 (May 1, 2003).
M. Gora et al., "Ultra-high-speed swept source OCT imaging of the anterior segment of the human eye at 200 kHz with adjustable imaging range", Optics Express, vol. 17, No. 17, pp. 14880-14894 (2009).
Suematsu, M. et al., "Wavelength-shift interferometry for distance measurements using the Fourier transform technique for fringe analysis," Applied Optics vol. 30, No. 28, 4046-4055 (Oct. 1, 1991).

\* cited by examiner

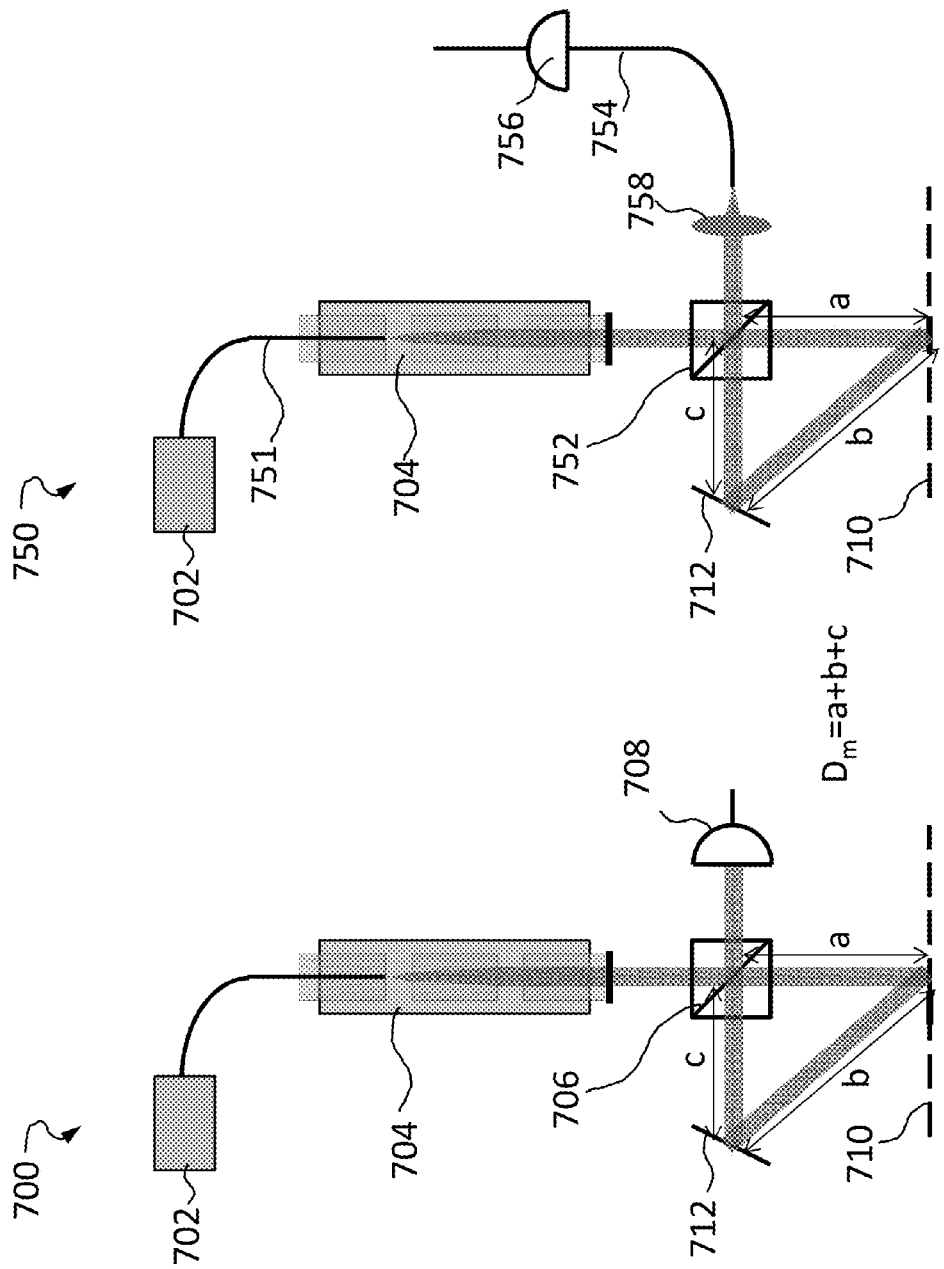

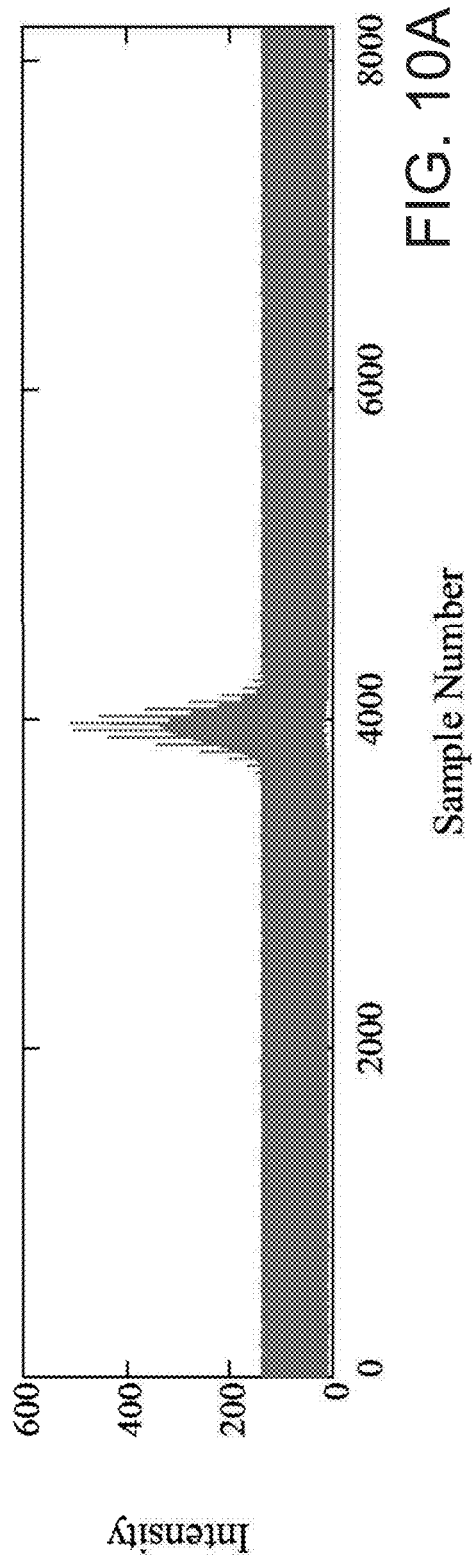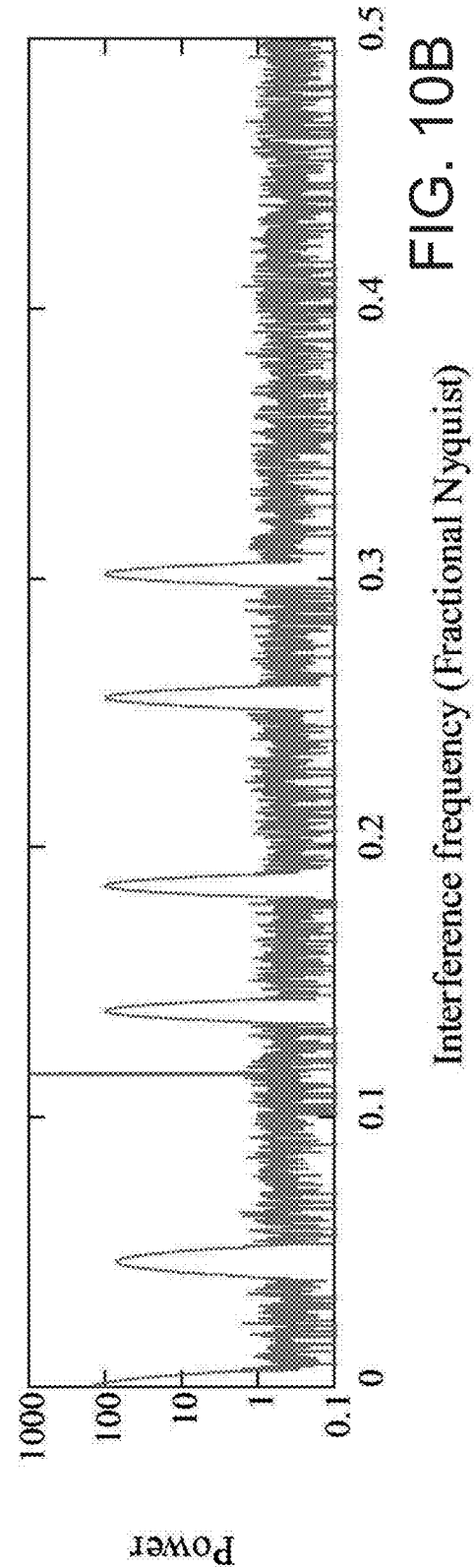

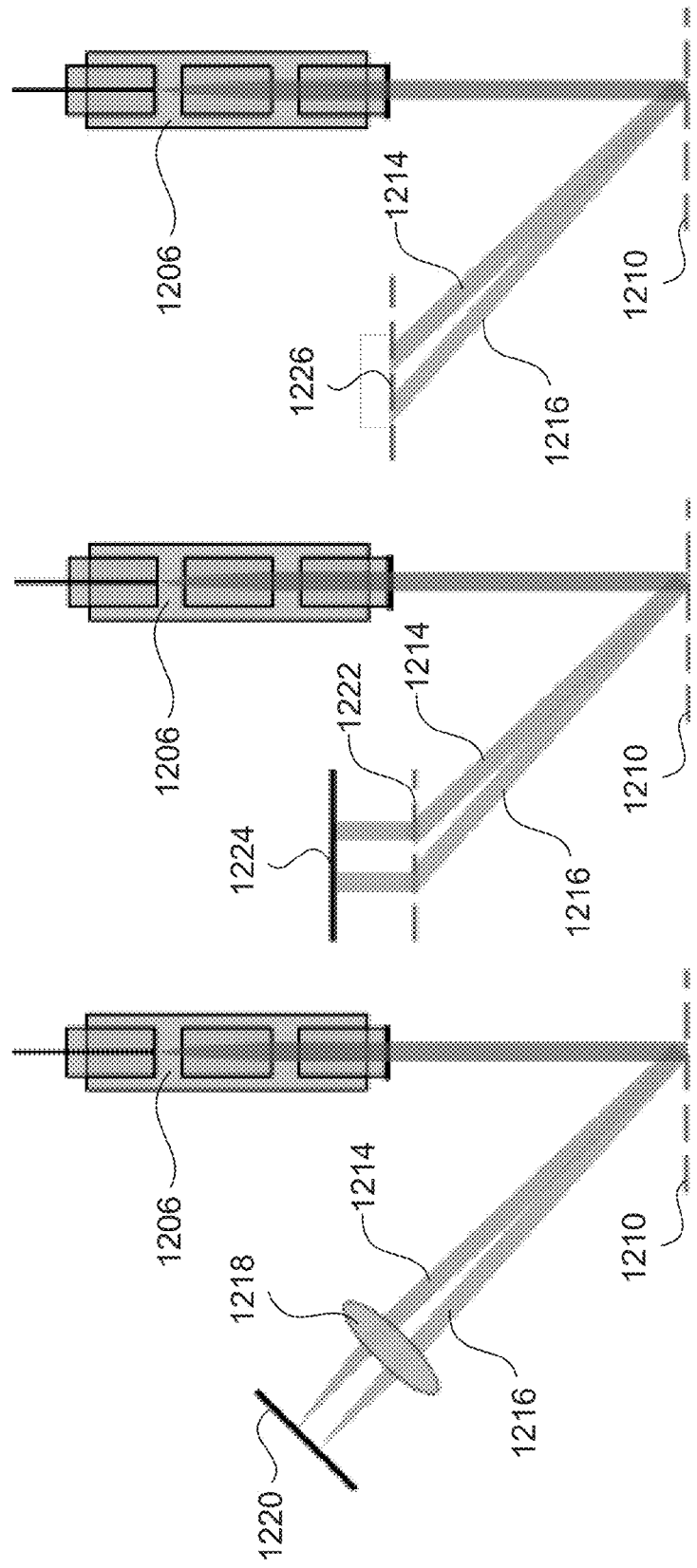

INTERFEROMETRIC ENCODERS USING SPECTRAL ANALYSIS

CROSS-REFERENCE TO RELATED APPLICATION

This application claims the benefit, under 35 U.S.C. §119(e), of U.S. Provisional Application No. 62/024,010, filed on Jul. 14, 2014, and which is hereby incorporated by reference in its entirety.

TECHNICAL FIELD

The present disclosure relates to interferometric encoders using spectral analysis.

BACKGROUND

Optical interferometry is used to make precise measurements in a variety of settings. For example, semiconductor lithography systems use laser interferometry to measure displacements and accurately position stages to nanometer precision. In these systems a laser beam (sometimes referred to as a test beam or measurement beam) aligned to the cavity motion is reflected off a mirror attached to the moving object and is interfered with another beam that serves as a reference. The interference phase changes by $2\pi$ each time the beam path changes by a wavelength, so the interference phase provides a measurement of changes in the cavity length. Heterodyne or homodyne techniques may be used to extract the phase of the interference.

Often in these systems the test light beam travels long distances in air. If the refractive index of the air in the beam path changes, even locally, the change manifests itself as an apparent displacement of the object being measured. This apparent displacement constitutes a measurement error and the longer the air path, the more serious this error is likely to be.

A class of displacement measurement interferometers with significantly shorter beam paths through includes interferometric encoder systems. Typically, an interferometric encoder system includes a periodic structure known as an encoder scale (e.g., a grating) and an encoder head. The encoder head is an assembly that includes an interferometer. The interferometer directs a test beam to the encoder scale, where it diffracts. The interferometer combines the diffracted test beam with a reference beam to form an interfering output beam whose interference phase is related to the optical phase difference between the two beams. Interferometric encoder systems measure displacement that is transverse to the test beam by measuring the phase shift of a beam reflected off of the encoder scale. As the patterned surface of the encoder scale moves under the test beam, the phase of the test beam relative to a fixed reference beam after reflecting off the encoder shifts by $2\pi$ for each pattern period. High precision measurements of the beam phase then allow displacement measurements to small fractions of a pattern period. Since the measured motion of the encoder scale is transverse to the test beam, significant reduction in the cavity length and hence the beam air path may be achieved, thereby minimizing atmospheric refractive index fluctuations.

SUMMARY

This disclosure relates to various optical encoder configurations for performing displacement measurements in which the configurations rely on either directing a wavelength-swept light beam towards an encoder scale or directing a broadband light beam towards the encoder scale. An interference beam resulting from an interference of the wavelength-swept beam or the broadband beam subsequent to interaction with the encoder scale and at least one other beam is recorded and analyzed as a function of wavelength. The interference results in intensity modulations that are characteristic of the position and orientation of the encoder scale with respect to a frame of reference.

The optical encoder configurations may have various implementations. For example, the incident light beam may be split by an encoder scale into different diffraction orders, which are redirected back to the encoder scale, where they diffract a second time and then subsequently interfere with one another. In some cases, the twice diffracted beams commonly interfere with another separate beam that has not interacted with the encoder scale. In some cases, the diffracted beams are redirected back to the encoder scale using plane mirrors, roof mirrors or retro-reflectors. In certain implementations, the encoder may include optical elements configured to broaden the usable wavelength range of the diffracted beams for signal processing. In some instances, the encoder scale includes a periodic pattern along one dimension (e.g., a 1D grating), such that the encoder is sensitive to motion of the encoder scale in one lateral dimension. In some instances, the encoder scale includes a periodic pattern along two dimensions (e.g., a 2D grating), such that encoder is sensitive to motion of the encoder scale in two lateral dimensions. In some instances, the encoder is configured to capture multiple diffraction orders for each dimension along which a pattern on the encoder scale repeats, thus allowing lateral motion of the encoder scale to be distinguished from motion of a surface normal to the encoder scale's periodic pattern(s). In some implementations, the encoder captures the specular diffraction order from the encoder scale in order to determine sensitivity to motion along the encoder scale's surface normal. In certain instances, the encoder is configured to evaluate a magnitude of the interference beam as a function of wavelength in order to gain information about a tilt of the encoder scale. In some cases, the captured beams are coupled back into the same optical fiber that delivered the initial beam. Alternatively, in some cases, the diffracted beams take an alternate path once they reach an optical assembly of the encoder. Other implementations are also possible and are detailed herein.

In a first aspect, the subject matter of the present disclosure may be embodied in methods that include directing a first beam and a second beam along different paths, in which the first beam diffracts from an encoder scale, combining a diffracted component of the first beam with the second beam to form an output beam, monitoring changes in the output beam intensity as a function of a wavelength of the first and second beams, and determining the information about one or more degrees of freedom of rigid body motion of the encoder scale based on changes in the output beam as a function of the wavelength.

The methods may have various implementations. For example, in some implementations, determining the information about the degree of freedom of the encoder scale includes determining an absolute distance between a reference surface and the encoder scale.

In some implementations, monitoring the output beam includes determining one or more wavelengths at which the interference contrast of the output beam is a local maximum. The encoder scale may include a grating and the one or more wavelengths that satisfy the Littrow condition. The encoder scale may be at a fixed position while the wavelength is varied. The method may further include varying a position of the encoder scale, and determining a change in the interference phase of the output beam as a function of the change in encoder scale position at at least one of the one or more wavelengths corresponding to a local maximum contrast in the optical frequency domain. Determining the information about a degree of freedom of rigid body motion of the encoder scale may further include determining information about a relative change in position of the encoder scale based on the change in interference phase. The information about the relative change in position of the encoder scale may include information about a relative displacement of the encoder scale along a direction parallel to the surface normal of the encoder scale and/or information about a relative displacement of the encoder scale along a first direction orthogonal to the surface normal of the encoder scale.

In some implementations, the diffracted component of the first beam includes a component that is once-diffracted from the encoder scale. The once-diffracted component may correspond to an $m^{th}$ order of diffraction from the encoder scale, wherein $|m| \geq 1$.

In some implementations, the diffracted component of the first beam that is combined with the second beam includes a first beam component that is once-diffracted by the encoder scale and a second beam component that is at least twice-diffracted from the encoder scale. An optical path length (OPL) corresponding to the space traversed by the first beam component may be different from an OPL corresponding to the space traversed by the second beam component. The second component may be reflected from a mirror. The mirror may include a plane mirror, a roof prism, or a corner retro-reflector. In some implementations, the diffracted component includes a first component that has been reflected from a first mirror and twice-diffracted by the encoder scale along a first plane defined by the first component and the first beam, a second component that has been reflected from a second mirror and twice-diffracted by the encoder scale along a second plane defined by the second component and the first beam, and a third component that has been once-diffracted by the encoder scale. The first plane and the second plane may be orthogonal to one another.

A first space traversed by the first component may have a first OPL, a second space traversed by the second component may have a second OPL, and a third space traversed by the third component may have a third OPL, in which each of the first OPL, the second OPL, and the third OPL is different. The diffracted component may further include a fourth component that has been reflected from a third mirror and twice-diffracted by the encoder scale along the first plane, and a fifth component that has been reflected from a fourth mirror and twice-diffracted by the encoder scale along the second plane, in which the first plane and the second plane are orthogonal to one another, a fourth space traversed by the fourth component has a fourth OPL, a fifth space traversed by the fifth component has a fifth OPL, and each of the first, second, third, fourth, and fifth OPL is different.

In some implementations, a beam path of the first beam is oriented parallel with respect to a surface normal of the encoder scale.

In some implementations, a beam path of the first beam is oriented obliquely with respect to a surface normal of the encoder scale and normal to a periodic surface pattern of the encoder scale.

In some implementations, the diffracted component of the first beam and the second beam form a first output beam, in which the encoder scale includes a surface pattern that is periodic in two dimensions. The method may further include directing a third beam and a fourth beam along different paths, in which the third beam diffracts from the encoder scale, and in which the paths of the first beam and the third beam are oriented obliquely with respect to the surface normal of the encoder scale.

The method may further include combining a diffracted component of the third beam with the fourth beam to form a second output beam, varying a wavelength of the third and fourth beams for a fixed position of the encoder scale, determining, based on the variation in wavelength of the first beam and the third beam, wavelengths of the first beam and the third beam at which a contrast of the first output beam and the second output beam in an optical frequency domain are local maxima, respectively, varying a position of the encoder scale, determining a change in the interference phase, as a function of the change in encoder scale position, of the first output beam and of the second output beam at the wavelengths corresponding to the local maxima, in which determining the information about a degree of freedom of rigid body motion of the encoder scale further includes determining information about a relative change in position of the encoder scale based on the changes in interference phase. The paths of the first beam and the third beam may lie in orthogonal planes. The first beam, the second beam, the third beam, and the fourth beam may have a common source.

In some implementations, a beam path of the first beam is oriented parallel with respect to a surface normal of the encoder scale. The diffracted component may include a first component that has been reflected from a first mirror and twice-diffracted by the encoder scale along a first plane, in which a path of the first component between the encoder scale and the first mirror corresponds to an $m^{th}$ order of diffraction, and in which $|m| \geq 1$. The diffracted component may include a second component that has been reflected from a second mirror and twice-diffracted by the encoder scale along the first plane, in which a path of the second component between the encoder scale and the second mirror corresponds to an $n^{th}$ order of diffraction, and in which $|n| \geq 1$.

The method may further include determining, based on the variation in wavelength of the first beam, one or more wavelengths of the first beam at which a contrast of the output beam in the optical frequency domain is a local maximum. The method may further include varying a position of the encoder scale and monitoring a change in the phase of the output beam at the one or more wavelengths corresponding to a local maximum contrast as a function of the change in position of the encoder scale, in which determining the information about a degree of freedom of rigid body motion of the encoder scale determining information about a relative change in position of the encoder scale along a first direction parallel to the surface normal of the encoder scale, a relative displacement of the encoder scale along a second direction that is orthogonal to the surface normal of the encoder scale, and relative displacement of the encoder scale along a third direction that is orthogonal to both the first and second direction.

The diffracted component may further include a third component that has been reflected from a third mirror and twice-diffracted by the encoder scale along a second plane orthogonal to the first plane, and a fourth component that has been reflected from a fourth mirror and twice-diffracted by the encoder scale along the second plane. Each mirror may be arranged at a different angle with respect to the normal of the encoder scale surface such that a maximum contrast between the first component and the second beam in the optical frequency domain occurs at a first wavelength, and a maximum interference between the second component and the second beam in the optical frequency domain occurs at a second wavelength that is different from the first wavelength.

In some implementations, determining the information about the position of the encoder scale includes determining information about motion of the encoder scale along up to five different degrees of freedom.

In some implementations, the encoder scale includes a surface pattern that is periodic in two dimensions.

In some implementations, the methods further include determining a tip and/or tilt of the encoder scale.

In some implementations, the diffracted component includes: a first component that has been reflected from a mirror and twice-diffracted by the encoder scale, in which a path of the first component between the encoder scale and the first mirror corresponds to an $m^{th}$ order of diffraction; and a second component that has been reflected from the mirror and twice-diffracted by the encoder scale, in which a path of the second component between the encoder scale and the second mirror corresponds to an $n^{th}$ order of diffraction, wherein n≠m. Each of the first component and the second component may be diffracted by a transmissive grating prior to reflection from the mirror.

In some implementations, the diffracted component includes: a first component that has been twice-diffracted by the encoder scale and diffracted by a separate reflective grating, in which a path of the first component between the reflective grating and the encoder scale corresponds to an $m^{th}$ order of diffraction; and a second component that has been twice-diffracted by the encoder scale and diffracted by the reflective grating, in which a path of the second component between the reflective grating and the encoder scale corresponds to an $n^{th}$ order of diffraction, wherein n≠m.

In some implementations, the methods further include coupling the output beam into an optical fiber.

In some implementations, the methods further include continuously tuning the optical wavelength of the input beam.

In some implementations, the methods further include discretely sampling a plurality of wavelengths of the input beam or the output beam.

In some implementations, the first and second beams are derived from a common optical source.

In some implementations, the first and second beams are derived from a different optical source.

In some implementations, the methods further include passing the output beam through a dispersive optical element to spatially separate the wavelength spectrum of the output beam.

In some implementations, a phase of the interfering output beam is related to the wavelength of the first and second beams.

In another aspect, the subject matter of the present disclosure may be embodied in systems that include a light source operable to produce an input light beam, an encoder scale, and an optical assembly arranged to: receive the input light from the optical source and derive, from the input light beam, a first beam and a second beam, direct the first beam and second beam along different paths toward the encoder scale, such that the first beam diffracts from the encoder scale, and combine a diffracted component of the first beam with the a second beam to form an output beam. The systems further include a detector arranged to detect the output beam and an electronic processor coupled to the detector, in which the processor is configured to: monitor changes in the output beam as a function of wavelength of the first beam, and determine information about a degree of freedom of rigid body motion of the encoder scale based on the changes in the output beam as a function of a wavelength of the first beam.

The systems may have various implementations. For example, in some implementations, the information about a degree of freedom of rigid body motion of the encoder scale may include an absolute distance between the optical assembly and the encoder scale.

In some implementations, the information about a degree of freedom of rigid body motion of the encoder scale may include information about motion of the encoder scale along up to five different degrees of freedom.

In some implementations, the electronic processor is configured to determine one or more wavelengths of the first beam at which a peak contrast of the output beam in the optical frequency domain is a local maximum. The electronic processor may be configured to determine a change in an interference phase of the output beam as a function of the change in encoder scale position at at least one of the one or more wavelengths corresponding to the local maximum contrast, and the information about a degree of freedom of rigid body motion of the encoder scale further may include information about a relative change in position of the encoder scale based on the change in interference phase. The information about the relative change in position of the encoder scale may include information about a relative displacement of the encoder scale along a direction parallel to the surface normal of the encoder scale and/or information about a relative displacement of the encoder scale along a first direction orthogonal to the surface normal of the encoder scale.

In some implementations, the optical assembly is arranged to output the first beam parallel with a surface normal of the encoder scale.

In some implementations, the optical assembly is arranged to output the first beam at an oblique angle with respect to a surface normal of the encoder scale and normal with respect to a period of a periodic surface pattern of the encoder scale.

In some implementations, the optical assembly includes a collimator arranged to receive the input light and output a collimated input beam and an optical element configured to partially reflect the collimated input beam into the second beam and partially transmit the collimated input beam as the first beam. The optical element may include a beam-splitter. The systems may further include a lens arranged in the beam path of the output beam between the beam-splitter and the detector.

In some implementations, the systems further include a first mirror arranged to redirect a first beam component of the first beam that is diffracted from the encoder scale. The first mirror may be a plane mirror, roof prism or corner-cube retro-reflector. A first optical path length (OPL) associated with a first optical beam path from the optical assembly to the encoder scale may be different from a second OPL associated with a second optical beam path from the first mirror to the optical assembly. The systems may further include a second mirror arranged to redirect a second beam component of the first beam that is diffracted from the encoder scale. A first OPL may be associated with a first optical beam path from the optical assembly to the encoder scale, a second OPL may be associated with a second optical beam path from the first mirror to the optical assembly, and a third OPL may be associated with a third optical beam path from the second mirror to the optical assembly, in which each of the first OPL, the second OPL and the third OPL is different.

The second optical beam path and the third optical beam path may be in orthogonal planes. The systems may further include a third mirror arranged to redirect a third beam component of the first beam that is diffracted from the encoder scale, and a fourth mirror arranged to redirect a fourth beam component of the first beam that is diffracted from the encoder scale, in which a fourth OPL is associated with a fourth optical beam path from the third mirror to the optical assembly, a fifth OPL is associated with a fifth optical beam path from the fourth mirror to the optical assembly, and in which each of the first OPL, the second OPL, the third OPL, the fourth OPL, and the fifth OPL is different from one another.

The systems may further include a lens arranged in the beam path of the first portion of the first beam between the mirror and the encoder scale, in which the mirror is located at a focal plane of the lens. The mirror may be further arranged to redirect a second portion of the first beam that is diffracted from the encoder scale, in which the lens is further arranged in a beam path of the second portion, and in which the first and second portion correspond to different orders of diffraction from the encoder scale.

The systems may further include a transmissive grating arranged in the beam path of the first portion of the first beam between the mirror and encoder scale. The mirror may be further arranged to redirect a second portion of the first beam that is diffracted from the encoder scale, in which the transmissive grating is further arranged in a beam path of the second portion, and wherein the first and second portion correspond to different orders of diffraction from the encoder scale.

In some implementations, the systems further include a grating structure arranged to receive and redirect back to the encoder scale a first portion of the first beam that is diffracted from the encoder scale. The grating structure may be arranged to receive and redirect back to the encoder scale a second portion of the first beam that is diffracted from the encoder scale, in which the first and second portion correspond to different orders of diffraction from the encoder scale.

In some implementations, the light source comprises a tunable light source, and wherein the electronic processor is configured to continuously scan a wavelength of the input light beam produced by the tunable light source.

In some implementations, the optical source includes a multi-wavelength source. The systems may further include a dense-wavelength-division-multiplexer (DWDM) coupled to the light source, in which the DWDM is configured to sample a discrete wavelength of the input light beam. The systems may further include a DWDM positioned in a beam path of the output beam between the detector and the optical assembly head, wherein the DWDM is configured to sample one or more discrete wavelengths of the output beam. The DWDM may be configured to simultaneously sample a plurality of discrete wavelengths of the output beam.

In some implementations, the optical assembly is a first optical assembly, the output beam is a first output beam, and the systems include a second optical assembly arranged to: direct a third beam and a fourth beam along different paths, such that the third beam diffracts from the encoder scale, and combine a diffracted component of the third beam with the fourth beam to form a second output beam. The first optical assembly and the second optical assembly may be both oriented at an oblique angle with respect to a surface normal of the encoder scale. The encoder scale may include a 2D periodic pattern having a first period and a second period, in which the first optical assembly is oriented normal to the first period and the second optical assembly is oriented normal to the second period.

In some implementations, the systems further include a reference light source to generate the second beam.

In some implementations, the systems further include a dispersive optical element arranged to receive the output beam and configured to spatially separate the wavelength spectrum of the output beam.

The different implementations may have various advantages. For example, the systems and methods described herein may combine the advantages of reduced measurement errors due to short beam paths through air plus the ability to perform absolute distance measurements. In some implementations, the systems and methods are capable of a substantial increase in measurement density as a result of wavelength tuning. For example, when different cavities of the interferometric encoder system have different optical path lengths, information about an encoder scale's multiple degrees of freedom may be obtained in a single wavelength scan, including, for example, the encoder scale's position and/or relative motion. In some implementations, the optical cavities do not need different optical path lengths. Instead, the optical cavities may be formed using reflective optical elements that are arranged at different angles, which in turn may give rise to the contrast peaks at different optical frequencies. In some implementations, if the encoder scale includes a two-dimensional periodic pattern having different periods (e.g., in X and Y directions), different wavelength bands can be used to analyze the position and/or relative motion of the encoder scale across different directions, including tip and/or tilt.

In some implementations, the mirrors used to form optical cavities in the interferometric encoder system are roof prisms that may reduce the sensitivity of the system to misalignments in the encoder scale and/or mirrors. In some cases, the interferometric encoder system may rely on multiple different cavities (e.g., 5 different cavities), enabling greater precision and reducing errors in measurement of the encoder scale's degree of freedom.

In certain implementations, a reference cavity is integrally formed as part of the interferometric encoder system, eliminating the need for a separate local reference interferometer. That is, the system may include a global reference cavity for monitoring the wavelength of light used in the system. In some implementations, the interferometric encoder systems can perform measurements of the encoder scale's position and/or relative motion using far fewer optical components than may be used with traditional encoder measurement systems. In some implementations, the use of an optical fiber to deliver an input light beam from an optical source to an optical assembly and to deliver an output beam from an optical assembly to a detector module further reduces the number of optical components and minimizes errors due to the interaction of light beams with air.

The details of one or more implementations of the invention are set forth in the accompanying drawings and the description below. Other features and advantages of the invention will be apparent from the description and drawings, and from the claims.

BRIEF DESCRIPTION OF THE DRAWINGS

FIGS. 1-8 are schematics illustrating examples of encoder systems having wavelength tunable beams.

FIG. 10A illustrates a plot of intensity for an encoder system in which a wavelength of a test beam is tuned.

FIG. 10B illustrates a power spectrum plot in fractional Nyquist and corresponds to the Fourier transform of the plot of FIG. 10A.

FIGS. 12A-12C are schematics that illustrate examples of interferometric encoder systems for broadening contrast peaks.

DETAILED DESCRIPTION

The present disclosure encompasses methods and systems relying on wavelength tuning to evaluate a phase of an interference signal, resulting in part from one or more various diffraction orders of an encoder scale, in order to obtain information about the encoder scale position and motion. In an encoder system, the motions of the encoder scale are encoded into the interference phase, such that measuring the interference phase can, in turn, be used to deduce the motions. Wavelength tuning provides a convenient and useful way to modulate the interference intensity in a known manner in order to recover the interference phase.

Figure 1:
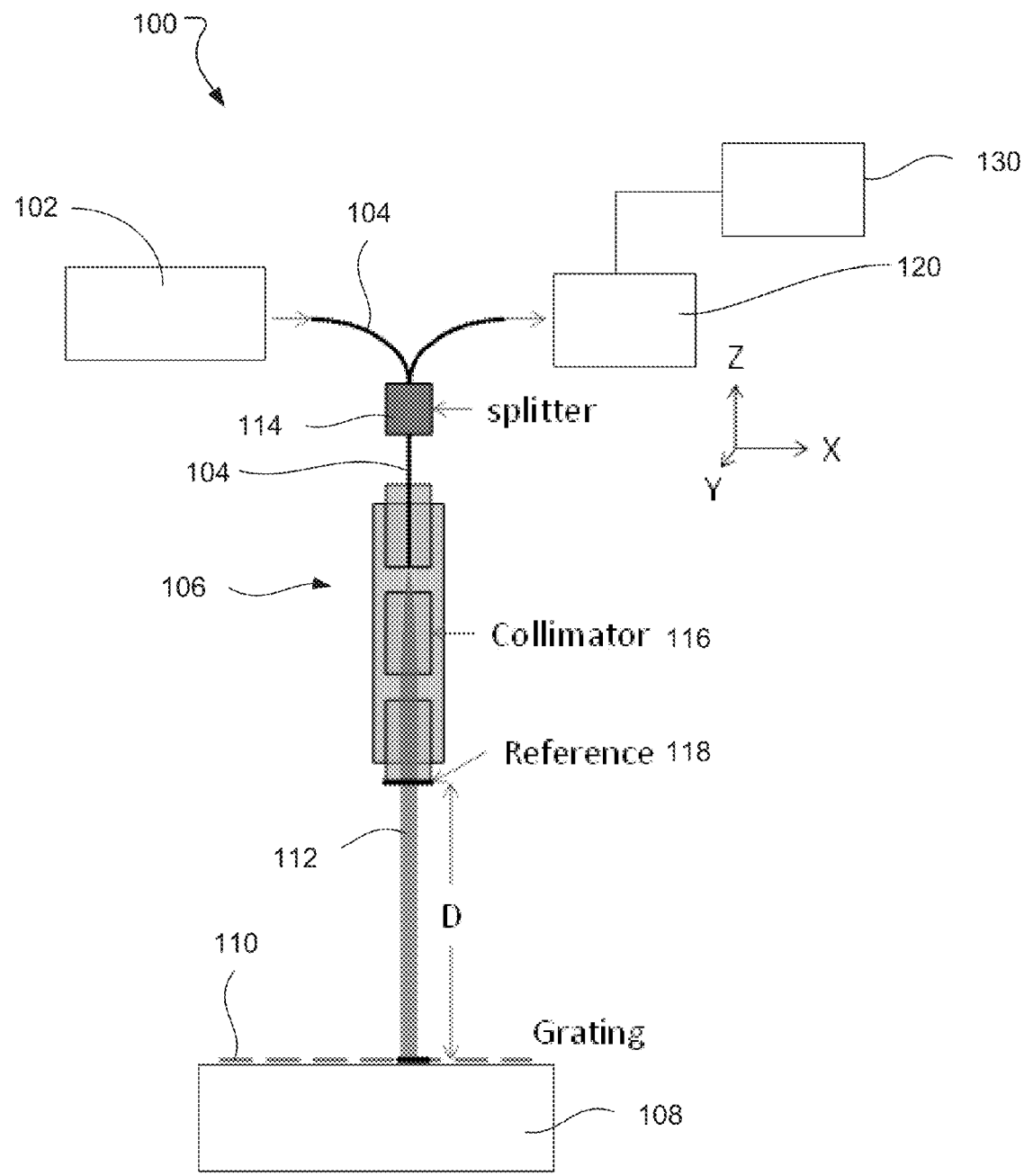

Referring to FIG. 1, an encoder system 100 includes an optical source module 102 (e.g., including a broadband or wavelength-tunable light source), an optical fiber 104, an optical assembly 106, a measurement object 108, a detector module 120 (e.g., including a polarizer and a photoelectric detector), and an electronic processor 130. Generally, optical source module 102 includes a light source and can also include other components such as beam shaping optics (e.g., lenses), wavelength filters and/or polarization management optics (e.g., polarizers and/or waveplates). Various implementations of the encoder system are described throughout the present disclosure. A Cartesian coordinate system is shown for reference.

Optical fiber 104 may be a single mode fiber or a multi-mode fiber. In some implementations, no fiber is needed and light is directed through free-space. Measurement object 108 is positioned some nominal distance from optical assembly 106 along the Z-axis. In many applications, such as where the encoder system is used to monitor the position of a wafer stage or reticle stage in a lithography tool, measurement object 108 is moved relative to the optical assembly in the X- and/or Y-directions, though the measurement object 108 may also move along the Z-axis. During operation, encoder system 100 monitors one or more of these degrees of freedom of measurement object 108 with respect to optical assembly 106, including a position of measurement object 108 with respect to the x-axis, and further including, in certain implementations, a position of the measurement object 108 with respect to the y-axis and/or z-axis and/or with respect to pitch (e.g., rotation about the x-axis and/or y-axis) and/or yaw (e.g., rotation about the z-axis) angular orientations.

In the implementation of FIG. 1, light (shown in FIG. 1 delivered through the fiber 104) is delivered from the optical source module 102 and passes through an optic component 114 (e.g., a beam splitter or optical circulator) to the optical assembly 106. The optical assembly 106 contains one or more optical components (e.g., a collimator 116) arranged to produce a collimated input beam. The optical assembly 106 also includes a reference surface 118, in which part of the collimated input beam reflects from the reference surface 118 to provide a reference beam (not shown) that travels back through the assembly 106 and is coupled back into the fiber 104. The reference surface 118 may be part of an optical element (e.g., a beam-splitter) that is configured to partially reflect the collimated input beam and partially transmit the collimated input beam. For example, the reference surface may be the exit phase of the last optical component in the assembly 106. The part of the collimated beam that is transmitted through the reference surface 118 (i.e., the test beam 112) is directed toward and strikes an encoder scale 110. The encoder scale 110 may be rigidly attached to the measurement object 108 or may be the measurement object itself.

The encoder scale 110 includes, e.g., a measuring graduation that diffracts the test beam 112 into one or more diffracted orders. In general, encoder scales can include a variety of different diffractive structures such as gratings or holographic diffractive structures. Examples or gratings include sinusoidal, rectangular, or saw-tooth gratings. Gratings can be characterized by a periodic structure having a constant period, but also by more complex periodic structures (e.g., chirped gratings). In some implementations, the encoder scale 110 can diffract the measurement beam into more than one plane. For example, the encoder scale can be a two-dimensional grating that diffracts the measurement beam into diffracted orders in the X-Z and Y-Z planes. The encoder scale may extend in the X-Y plane over distances that correspond to the range of the motion of measurement object 108. In general, the selection of the diffractive structure used (e.g., grating period) can vary depending on the wavelength of the input beam and the arrangement of optical assembly and diffracted orders used for the measurement. In some implementations, the diffractive structure is a grating having a period in a range from about $1\lambda$ to about $20\lambda$, where $\lambda$ is a wavelength of the source. The grating can have a period in a range, for example, from about 1 µm to about 10 µm. Other periods are possible as well.

Subsequent to striking the encoder scale 110, the $0^{th}$ order diffracted beam passes back through the optical assembly 106 and is recoupled into the fiber 104. The reference and test beams in the fiber 104 combine to produce an output beam that is redirected by the splitter/circulator 114 to the detector module 120, which detects the output beam and sends an interference signal to electronic processor 130 in response to the detected output beam. Electronic processor 130 receives and analyzes the signal and determines information about one or more degrees of freedom of measurement object 108 relative to optical assembly 106. FIG. 1 is just one example of an interferometric displacement measuring system. Further examples and additional information about the arrangement and configuration of encoder systems may be found in U.S. Pat. No. 8,300,233, incorporated herein by reference in its entirety.

Relative to the reference beam, the phase φ of the test beam depends on the optical path length (OPL) nD traversed and the optical frequency of the light, and can be expressed as $$\varphi = \frac{4\pi nD}{\lambda} = \frac{4\pi nD}{c}v, \quad (1)$$

where $v=c/\lambda$ is the vacuum optical frequency ($\lambda$ is the wavelength), n is the refractive index of the medium along D, and D is the physical path length of a cavity region (single pass) defined by the space traveled by the beam between the encoder scale 122 and the reference surface 118 of the optical assembly 106. Assuming D and n are fixed as the optical frequency is swept, the interference phase of the output beam may vary according to $$\Delta\varphi = \frac{4\pi nD}{c}\Delta v \quad (2)$$

where Δ signifies a change or variation in a variable. Thus, if the optical frequency range Δv is known, the distance D can be determined absolutely—in contrast to typical displacement measuring interferometer systems, which measure relative displacement.

Alternatively, assuming the collimator assembly position is fixed and the encoder scale is allowed to move along the z-axis, the phase of the $0^{th}$ order interference at a fixed wavelength is sensitive to a change Δz in the OPL and can be expressed as $$\Delta\varphi^{(0)} = -\frac{4\pi}{\lambda}\Delta z \quad (3)$$

where the negative sign indicates that the phase is reduced if the grating moves in the +z direction (i.e., toward the collimator assembly 106 shown in FIG. 1). The implementation shown in FIG. 1 is sensitive to motions perpendicular to the plane of the grating (i.e., out-of-plane motion or along the beam axis) but not in-plane motions parallel to the grating.

The optical frequency of the output beam may be tuned by sweeping the optical frequency of light provided from the optical source module 102. For example, in some implementations, the source module 102 includes a wavelength/frequency-tunable light source, in which the optical frequency of light output by the source may be varied by adjusting the optical path length of the lasing cavity (e.g., by adjusting a refractive index of the lasing cavity, by mechanically adjusting a length of the lasing cavity, or by thermally varying the optical path length of the lasing cavity). In other implementations, the optical source module 102 may include a broadband light source (e.g., Xenon lamp or quartz tungsten halogen lamp) for which discrete wavelengths are sampled. For instance, the optical source module 102 may include an integrated adjustable filter having multiple chromatic filters that can be varied to isolate different wavelengths of the source. The optical source module 102 may be coupled to the electronic processor 130, which controls the optical frequency of the light beam by altering the chromatic filter applied to light generated by the source. Other options for discretely sampling the wavelength are described with respect to FIGS. 13A-13B. Whether by continuously tuning the light source or by discretely selecting the wavelength, the optical source module 102 may provide a relatively wide range of useable wavelengths. For instance, the optical source module 102 may be able to output wavelengths of light over a range of up to about 700 nm (e.g., a range of about 600 nm, about 500 nm, about 400 nm, about 300 nm, about 200 nm, about 100 nm, or about 50 nm). Wavelengths in the visible and near infrared (e.g., from about 400 nm to about 2,000 nm) can be used. An example wavelength range includes between about 1,000 nm and about 1,600 nm. The optical source module 102 may sweep the range of wavelengths up to a rate of about 100 kHz or more (e.g., up to about 150 kHz, up to about 200 kHz, up to about 300 kHz, up to about 400 kHz, or up to about 500 kHz). Maximum frequencies of up to about 1 MHz may be used.

Figure 2:
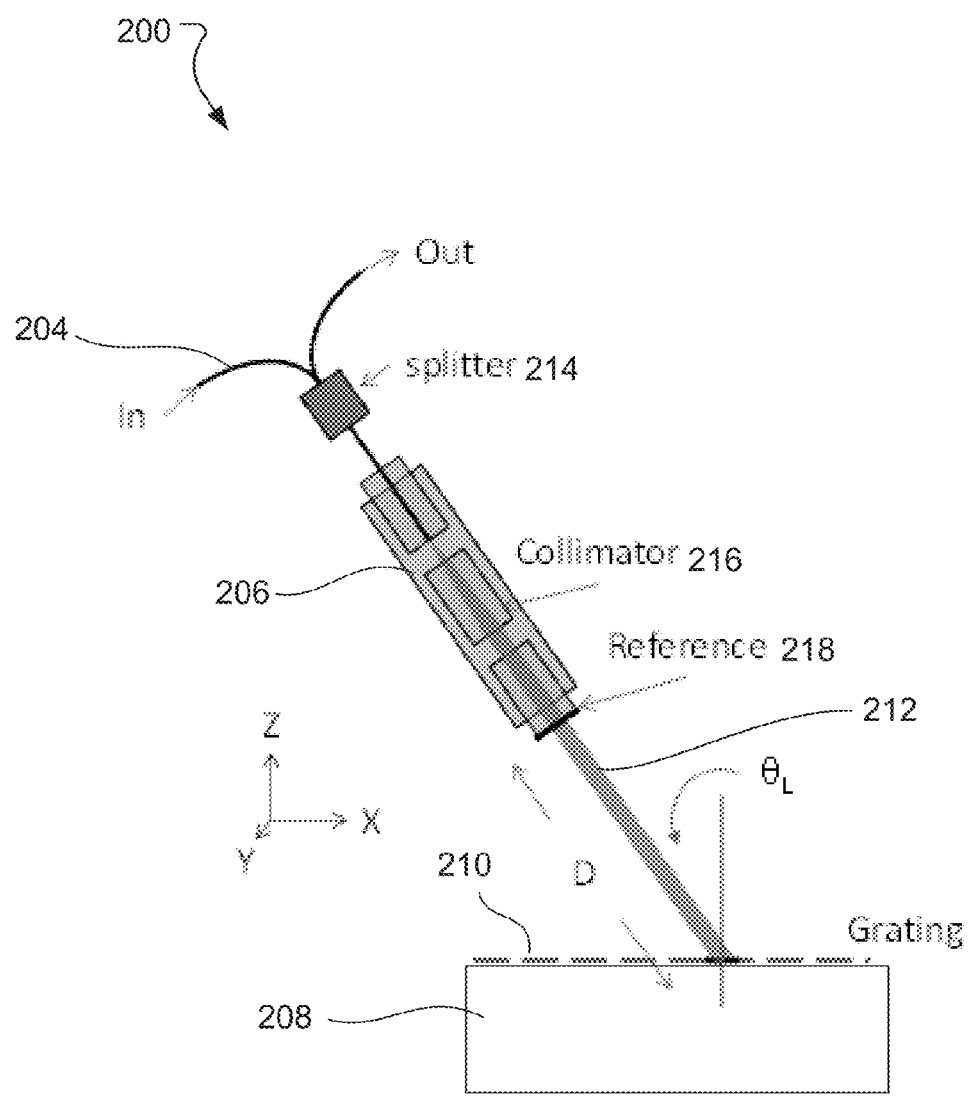

Multiple variations may be made to the implementation shown in FIG. 1 to obtain additional and/or different information about the measurement object. For example, FIG. 2 is a schematic illustrating an example encoder system 200 that enables determining information about multiple degrees of freedom of a measurement object. As in FIG. 1, the encoder system 200 includes an optical fiber 204 for receiving light from an optical source module, an optical assembly 206 for deriving a test beam 212 and a reference beam (not shown), and a measurement object 208 to which an encoder scale 210 is attached. The optical source module, detector module and electronic processor of system 200 are omitted for clarity. The optical assembly 206 contains one or more optical components (e.g., a collimator 216) arranged to produce a collimated beam and a reference surface 218 to reflect the reference beam and to allow the test beam to pass through to the encoder scale 210. A first cavity is defined by the space traveled by the beam between the optical assembly 206 and the encoder scale 210 and has an optical path length of nD.

In contrast to the system 100 of FIG. 1, the optical assembly 206 is tilted with respect to an encoder scale surface normal so that the test beam 212 strikes the encoder scale 210 at the Littrow angle $\theta_L$. As the wavelength of the test beam 212 is swept, the diffracted beam angle changes in accordance with the grating equation;

$$\frac{m\lambda}{\Lambda} = \sin(\theta_i) + \sin(\theta_m) \quad (4)$$

where $\theta_i$ and $\theta_m$ are the incident angle and $m^{th}$ order diffraction angle respectively, Λ is the grating period and all angles are measured relative to the encoder scale surface normal. Longer wavelengths diffract into a larger angles than shorter wavelengths for fixed Λ. In general both positive and negative diffraction orders (m) will exist so m is a signed integer.

Thus, as the wavelength is swept, the angle of a returning test beam (which has been diffracted by the encoder scale 210) varies such that the returning test beam sweeps across the optical assembly 206. The returning test beam is nominally retro reflected along the incident test beam path only for a range of wavelengths close to the wavelength $\lambda_L$ for which the Littrow condition is satisfied:

$$m\lambda_L = 2\Lambda \sin(\theta_L) \quad (5)$$

The returning test beam and the reference beam are combined by the optical assembly 206 to produce an output beam that is detected by the detector module. The observed interference contrast of the output beam due to interference of the diffracted test beam and reference beam exhibits a maximum at $\lambda_L$ during a wavelength sweep. This phenomenon is referred to here as "contrast peaking" or "peak contrast" and has many implications to the sensor design and function as will be explained later.

Setting the reference position as the coordinate origin, the instantaneous interference phase depends on the point where the beam strikes the encoder scale and can be expressed as $$\varphi_{(x,z)}^{(m)} = \frac{2\pi m}{\Lambda}x - \frac{2\pi n}{\lambda}\cos(\theta_L)z \tag{6}$$

for a one-dimensional periodic structure such as shown in FIG. 2, where (x,z) is the point where the test beam strikes the grating in the x-z plane. Additionally, since D can be measured with Eq. (2), the x and z relative motion can be decoupled and derived with the following two equations;

$$\Delta z = \Delta D \cos(\theta_L), \tag{7}$$

and $$\Delta \varphi_{(x,z)}^{(m)} = \frac{2\pi m}{\Lambda}\Delta x - \frac{4\pi n}{\lambda}\cos(\theta_L)\Delta z, \tag{8}$$

Accordingly, by analyzing the interference modulation over a sweep, the Littrow wavelength $\lambda_L$ and absolute distance D to the encoder scale 210 can be deduced. The phase variation at the contrast peak, in turn, provides information about the relative change in position of the encoder scale 210 along multiple degrees of freedom.

The encoder scale 210 in FIG. 2 is assumed to have a 1-dimensional periodic structure that is periodic in the x-direction, such that the diffracted beam travels in the x-z plane. If the structure is periodic along 2 dimensions, however, another optical assembly head can be provided in the y-z plane to detect a diffracted test beam in the y-z plane, and subsequently measure the y direction motion. Similar to the first optical assembly, the second optical assembly may include, for example, a collimator to receive input light and may derive a second test beam and second reference beam using a partially reflective reference surface. The second test beam and second reference beam may be derived from a light beam produced by the same optical source as the first test beam and first reference beam. Alternatively, the second test beam and second reference beam may be derived from a light beam produced by a different optical source.

Relative y and z displacements for the second optical assembly can be determined from the expression $$\Delta \varphi_{(y',z')}^{(m)} = \frac{2\pi m}{\Lambda}\Delta y' - \frac{4\pi n}{\lambda}\cos(\theta_L)\Delta z'. \tag{9}$$

where the prime indicates the variable is associated with the second optical assembly. The second optical assembly also forms a second cavity defined by the space traveled by the test beam between a reference surface of the second cavity and the surface of the encoder scale, and having a physical distance D'. Since these two assemblies have different references, the OPL nD' for the second cavity formed by the second optical assembly will in general be different from the OPL nD for the first cavity formed by the first optical assembly 206. However $\Delta z$ is common to both.

Figure 3:
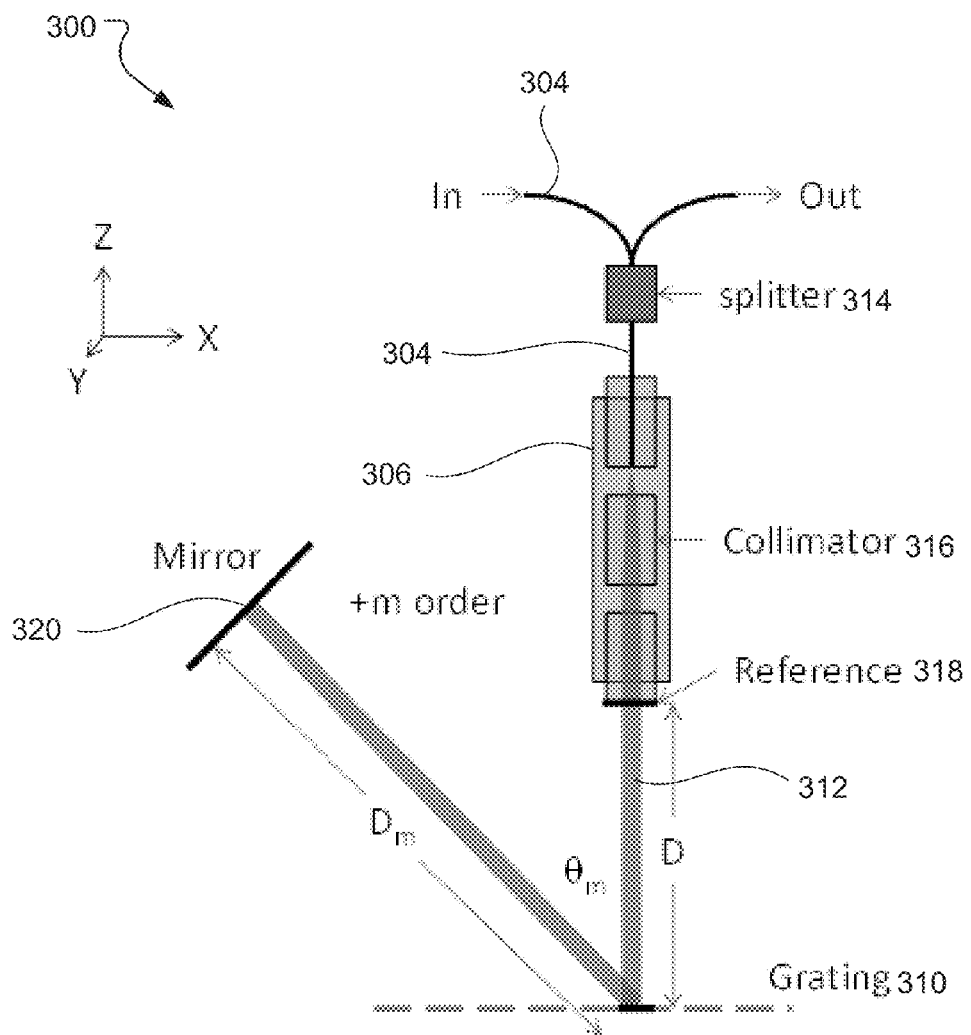

FIG. 3 is a schematic illustrating another implementation of an encoder system utilizing wavelength tuning. As shown in FIG. 3, the system 300 includes an optical fiber 304 for receiving an input beam from an optical source module, an optical assembly 306 for deriving a test beam 312 and a reference beam (not shown) from the input beam, and an encoder scale 310. The measurement object, optical source module, detector module and electronic processor of system 300 are omitted for clarity. The optical assembly 306 contains one or more optical components (e.g., a collimator 316) arranged to produce a collimated input beam and a reference surface 318 to reflect a first portion of the input beam (producing the reference beam) and to transmit a second portion of the input beam as the test beam 312. The system 300 also includes a reflector 320 (e.g., a mirror).

During operation, the test beam 312 impinges on the encoder scale 310, resulting in a $0^{th}$ order diffracted test beam that returns to the optical assembly 306 along the same path as the incident test beam 312, as well as in a $m^{th}$ order diffracted test beam that travels at an angle $\theta_m$ with respect to an encoder scale surface normal. The $m^{th}$ order diffracted beam is redirected back to the encoder scale 310 by reflector 320, from which the beam is diffracted again along a path that is co-incident with the $0^{th}$ order diffracted test beam. Thus, the difference between the $m^{th}$ order and $0^{th}$ diffracted test beam path is the additional optical length traversed by the $m^{th}$ order beam, i.e., $nD_m$. Both of these beams travel back through the optical assembly 306, interfere with the reference beam and are recoupled into the fiber 304 and directed by the splitter/circulator to the detector module where the interference is analyzed by an electronic processor. Assuming the encoder scale is a periodic grating, then to $1^{st}$ order this configuration has two interfering cavities; the reference-grating (RG) cavity (having an optical path length equal to nD) and the reference-mirror (RM) cavity (having an optical path length equal to $nD+nD_m$). The RM cavity thus corresponds to the region traveled by the $m^{th}$ order diffracted test beam between the reflector 320 and the encoder scale 310 plus the region traveled by the incident and diffracted test beams between the encoder scale 310 and the optical assembly 306, whereas the RG cavity corresponds to the region traveled by the incident and diffracted test beams between the encoder scale 310 and the optical assembly 306. Multiple interference creates additional higher-order cavities but these are ignored for the moment.

The interference of the two $1^{st}$ order cavities behaves differently as the optical frequency is swept. The interference contrast at the detector due to the RG cavity is essentially constant during the sweep because there is no angular change of the beams due to the sweep so the interference phase may be governed by Eq. (3), reproduced below and taking into account the refractive index n of the optical medium through which the light travels:

$$\Delta \varphi^{(RG)} = -\frac{4\pi n}{\lambda}\Delta z. \tag{10}$$

On the other hand the interference contrast due to the RM cavity is a maximum at wavelengths for which the $m^{th}$ order diffracted test beam strikes the mirror normally. From the grating equation (Eq. (4)) this occurs at $$\lambda_m = \Lambda \sin(\theta_m)/m \tag{11}$$

The interference phase associated with the RM cavity will be sensitive to both in-plane and out-of-plane grating motions according to $$\Delta\varphi_{(x,z)}^{(RM,m)} = \frac{4\pi m}{\Lambda}\Delta x - \frac{4\pi n}{\lambda}[1+\cos(\theta_m)]\Delta z \quad (12)$$

Since the light in the RM cavity strikes the grating twice compared to the geometry of FIG. 2, there is an additional factor of 2 in the 1st term compared to Eq. (6). Assuming both cavities phases are simultaneously measured, the x and z displacements can be solved using Eq. (10) and (12).

Since the two cavities have different OPLs, their interference frequencies will be different and hence their phases can be simultaneously measured with a Fourier Transform (or other type of frequency sensitive filter). Thus the implementation of FIG. 3 provides measures of both x and z displacements simultaneously. Note that Equation (12) describes the phase behavior at a fixed wavelength but the extraction of the phase at that wavelength is done by analyzing the modulated intensity recorded for a range of wavelengths, as will be shown later.

If the encoder scale is 2-dimensional, another mirror can be placed to intercept the y diffraction, this forming a third cavity corresponding to the region traveled by the test beam between the second mirror and the encoder scale 310 plus the region traveled by the test beam between the encoder scale 310 and the optical assembly 306. The phase of the output beam from this third cavity will be sensitive to in-plane and out-of-plane grating motions according to $$\Delta\varphi_{(y,z)}^{(RM,m)} = \frac{4\pi m}{\Lambda}\Delta y - \frac{4\pi n}{\lambda}[1+\cos(\theta_m)]\Delta z \quad (13)$$

Combining the three phase measurements through Eqs (10), (12) and (13) provide simultaneous measurements of displacements along x, y and z. As long as all three cavities have different OPLs so the phases are frequency separable in the measured output beam, all three phase measurements can be made with a single optical assembly and corresponding detector module.

Figure 4:
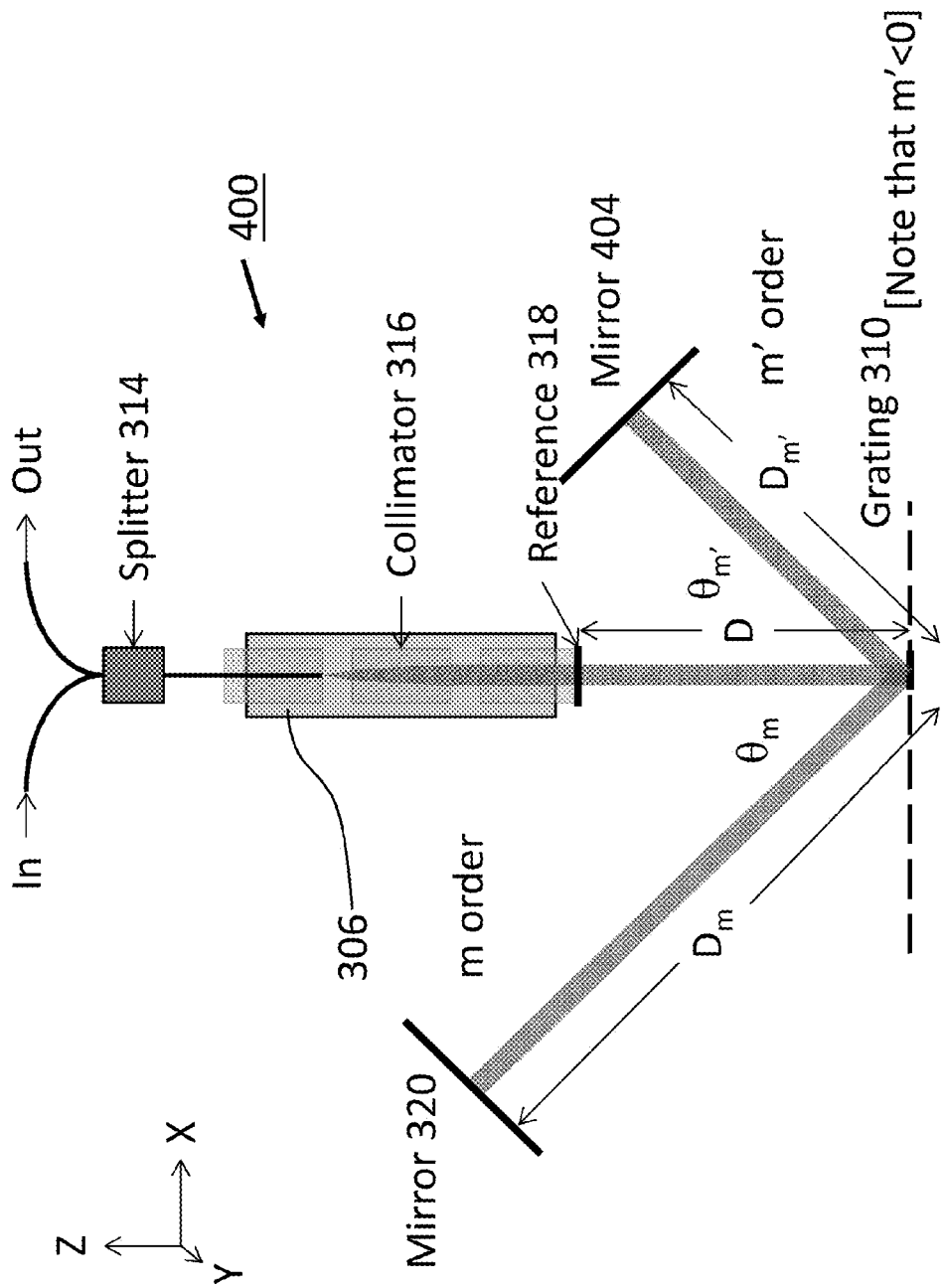

The unknown parameters $\Delta x$, $\Delta y$ and $\Delta z$ can also be found by monitoring the negative order diffraction to the implementation shown in FIG. 3. For example, the encoder system 400 shown in FIG. 4 is similar to the system 300, except that the system 400 includes a second cavity to measure the negative $m'^{th}$ order diffraction from the encoder scale 310. The second cavity corresponds to the region traveled by the $m'^{th}$ order diffracted test beam between the second reflector 404 and the encoder scale 310 plus the region traversed by the incident test beam and diffracted test beams between the encoder scale 310 and the optical assembly 306. The OPL of the second cavity therefore can be expressed as $nD_{m'}+nD$.

Since the first term in equations (12) and (13) changes sign for the negative diffraction orders, suitable linear combinations of positive and negative order phase measurements can be used to decouple these parameters. For example, labeling the negative diffraction order cavities as m', $\Delta x$ and $\Delta z$ can be obtained with $$\Delta z = \frac{\lambda}{4\pi n}\frac{m'\Delta\varphi_{(x,z)}^{(m)} - m\Delta\varphi_{(x,z)}^{(m')}}{[m(1+\cos(\theta_{m'})) - m'(1+\cos(\theta_m))]} \quad (14)$$

$$\Delta x = \frac{\Lambda}{4\pi}\frac{\Delta\varphi_{(x,z)}^{(m)}(1+\cos(\theta_{m'})) - \Delta\varphi_{(x,z)}^{(m')}(1+\cos(\theta_m))}{[m(1+\cos(\theta_{m'})) - m'(1+\cos(\theta_m))]} \quad (15)$$

and similar equations for $\Delta y$.

In general |m| need not be equal to |m'|, but the geometry is simplified if it is. For example, if m=1, m'=−1, Eqs. (14) and (15) reduce to;

$$\Delta x = \frac{\Lambda(\Delta\varphi_{(x)}^{(1)} - \Delta\varphi_{(x)}^{(-1)})}{8\pi} \text{ and } \Delta z = \frac{\lambda(\Delta\varphi_{(x)}^{(1)} - \Delta\varphi_{(x)}^{(-1)})}{8\pi n(1+\cos(\theta_1))} \quad (16)$$

Similar equations can be obtained using the y cavities. If both + and − orders for both x and y directions are used, the additional redundancy can be exploited to reduce measurement errors. Note however that since a single channel (e.g., through the optical assembly and output fiber) carries all the information, all 5 cavities ($0^{th}$ order, two positive orders and two negative orders) must have different optical lengths so that the phases are frequency separable in the measured output beam.

Figure 5:
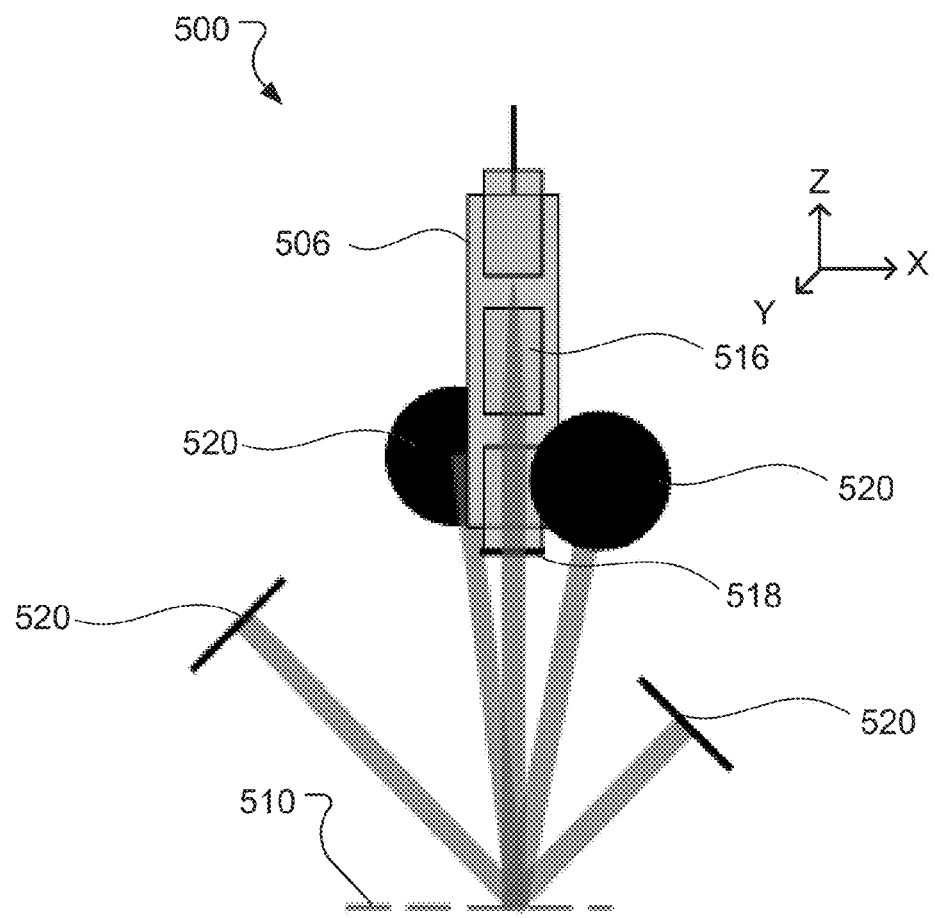

For instance, FIG. 5 is a schematic illustrating an encoder system 500 similar to the system 300 of FIG. 3, in that it includes an optical assembly 506 having a collimator 516 and reference surface 518, an encoder scale 510, and mirrors 520 to deflect diffracted test beams back to the encoder scale 510. In contrast to FIG. 3, the mirrors 520 are arranged to deflect both the + and − diffraction orders along both the x-z and y-z planes. Note, however, that since a single optical assembly carries all the information, all 5 cavities ($0^{th}$ order, two positive orders and two negative orders) must have different optical lengths so that the phases are frequency separable. This can be achieved by arranging the mirrors 520 so that each mirror 520 is located at a different distance from the encoder scale 510 than the other three mirrors.

The three implementations shown in FIGS. 1-3 have measurement characteristics summarized in Table 1. For this table, it is assumed that the encoder system uses a single optical assembly/detector module and a 2-D grating as the encoder scale. For each column, the encoder system either: measures (M), is sensitive to (S) or is insensitive to (I) changes in that degree of freedom. Note that for the implementation shown in FIG. 2, the y-axis can be measured, but only by adding another optical assembly/detector module combination.

TABLE 1

| Sensitivity to motion along the 6 degrees of freedom | | | | | | |
|---|---|---|---|---|---|---|
| Implementation shown in FIG. | Degree of freedom | | | | | |
| | X | Y | Z | Θx | Θy | Θz |
| 1 | I | I | M | S | S | I |
| 2 (X) | M | I | M | S | S | S |
| 3 | M | M | M | M | M | S |

Figures 6A, 6B:
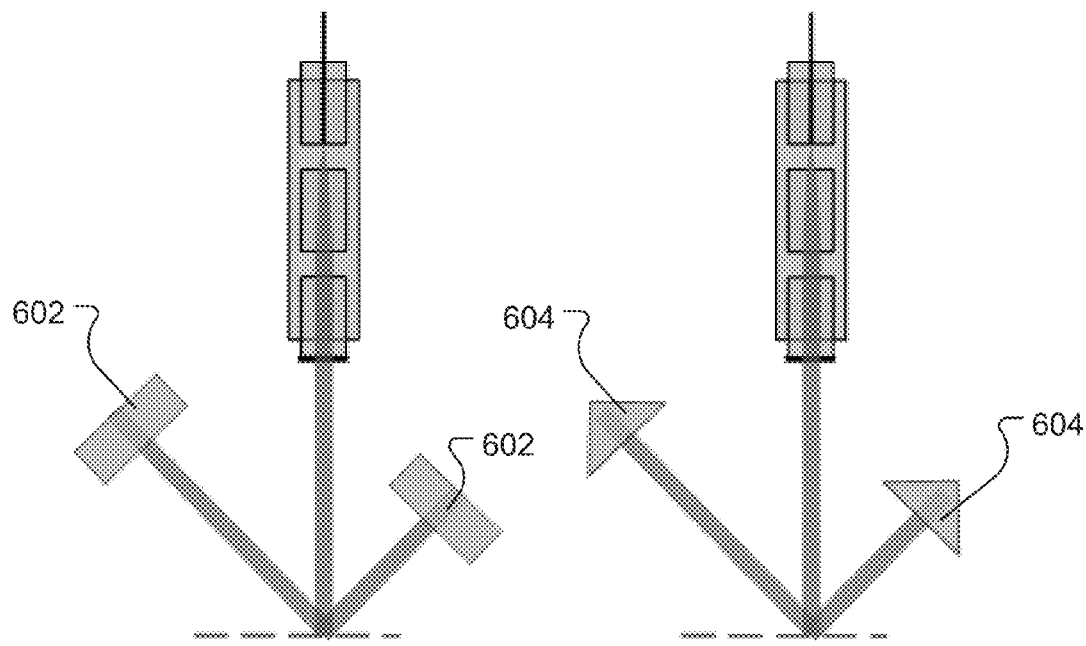

Though the implementations shown in FIGS. 3-5 utilize mirrors to create the optical cavities, other optical elements can be advantageously substituted. For example, FIGS. 6A and 6B are schematics illustrating two alternative encoder system arrangements, in which the reflectors include roof mirrors 602 and corner cube retro-reflectors 604, respectively. A corner cube retro-reflector is an optic manufactured from the intersection of three mutually perpendicular plane mirrors (i.e., the corner of a cube). The corner cube will retro-reflect a beam that strikes any one of the mirror faces. A roof mirror or prism is an optic made from two mutually perpendicular mirrors (i.e., one of the edges of a cube). It differs from a corner-cube in that the roof prism can only retro-reflect a beam which lies in a plane perpendicular to both of the mutually perpendicular mirrors. An advantage of using roof mirrors and retro-reflectors is that they improve the tolerance of the encoder system with respect to variations in the encoder scale (e.g., errant tilting of the encoder scale and/or variation in grating structure) or other features that might lead to deviations in the angles of the diffracted test beams.

Another advantage of the implementations shown in FIGS. 1-6 is that the encoder systems do not require a large number of components and can be formed compact since the diffracted test beam and reference beam return along the same optical fiber that is used for illumination. Nonetheless, other implementations are also possible that do not entail sending the reference beam and diffracted test beam(s) back along the same path used for illumination.

For example, FIG. 7A is a schematic that illustrates an encoder system 700 in which the reference beam and test beam are combined separate from the optical assembly 704. In particular, a collimated input beam from an optical source module 702 is delivered via the collimating optic of the optical assembly 704 to a beam splitting component 706. The beam splitting component 706 splits the collimated input beam into a first portion (e.g., a reference beam) that is redirected toward a detector module 708 and a second portion (e.g., a test beam) that is transmitted toward an encoder scale 710. Once the test beam is diffracted from the encoder scale 710, it is then reflected by a reflector 712 (e.g., a mirror) back to the beam splitting component 706, where the diffracted test beam is combined with the reference beam to form an output beam. The detector module 708 detects the output beam to produce an interference signal that may be analyzed by an electronic processor (not shown). The second cavity has a corresponding OPL $nD_m$ defined by the distance traversed by the diffracted beam from the beam-splitting interface of component 706 to the encoder scale 710 (distance "a" in FIG. 7A), from the encoder scale 710 to the reflector 712 (distance "b" in FIG. 7A), and back to the beam-splitting interface (distance "c" in FIG. 7A).

As in other implementations, the angle of the diffracted test beam, as measured with respect to the encoder scale surface normal, will vary with a change in the optical frequency of the test beam, leading to a corresponding variation in the interference intensity of the output beam. Once the optical frequency associated with maximum interference intensity is determined for each cavity, the phase changes at those frequencies may be analyzed to determine information about the different degrees of motion of the encoder scale 710.

FIG. 7B is a schematic that illustrates a variation of the encoder system shown in FIG. 7A. In FIG. 7B, an encoder system 750 includes the beam splitting element 706 but also includes a second optical fiber 754, separate from the input fiber 751, that is coupled to the detector module 756. The output beam, which includes the reference beam and diffracted test beam is coupled into the optical fiber 754 using a lens 758. Though lens 758 is shown here separated from the fiber 754, the lens 758 may be coupled to the end of the fiber 754. An advantage of the implementations shown in FIGS. 7A and 7B is that they minimize the interaction of the test beam with the encoder scale, and thus increase the radiometric efficiency of the encoder system. That is, since diffraction itself can be inefficient due to the creation of multiple orders of diffracted beams, it is advantageous to reduce the number of times that the test beam actually is diffracted by the encoder scale. When there are fewer interactions between the test beam and the encoder scale, the intensity of the diffracted test beam that finally interferes with the reference beam may be greater, thus improving the signal to noise ratio of the interference signal analyzed by the electronic processor. In addition, another advantage is that recoupling into a fiber provides spatial filtering that significantly reduces spurious interference from scattered light.

As explained above, an important design consideration is setting the various cavity optical lengths so the signal phases from each cavity can be extracted cleanly from the output beam interference signal.

Due to contrast peaking, modifying the mirror tilt is another option. Cavities with different OPL's can be isolated in the Fourier domain, whereas modifying the mirror tilt isolates the cavities in the time domain because the interference signal occurs in a different point in the wavelength scan. It can be advantageous to adjust the tilt of the cavity test mirrors so that maximum interference occurs at different wavelengths for different cavities, thereby allowing clean signal extraction.

Figure 8:
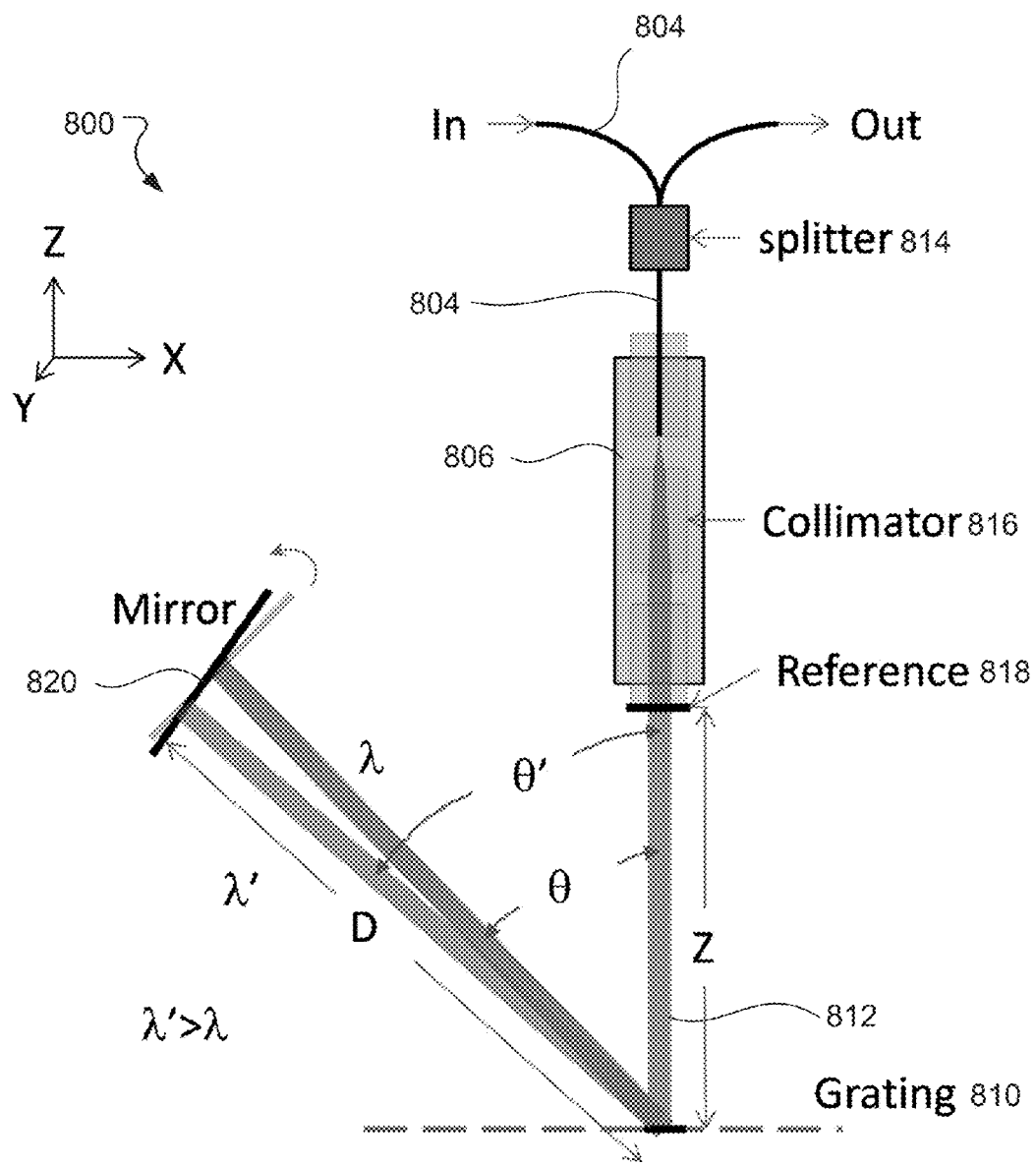

Thus, test mirror tilt is another encoder system design consideration. FIG. 8 is a schematic that illustrates an example of an encoder system 800 that relies on tilting the mirrors to isolate the different cavities in the time domain. Similar to the encoder system implementation shown in FIG. 3, the system 800 includes an optical fiber 804 for receiving an input beam from an optical source module, a splitter 805, an optical assembly 806 (having a collimator 816 and reference surface 818) for deriving a test beam 812 and a reference beam (not shown) from the input beam, an encoder scale 810, and a plane mirror 820. The measurement object, optical source module, detector module and electronic processor of system 800 are omitted for clarity. The mirror 820 is rotatable about an axis (e.g., the y-axis in FIG. 8). As the mirror 820 is rotated about its axis, the wavelength associated with normal reflection from the mirror 820, and thus maximum interference, shifts from $\lambda$ to $\lambda'$, where $\lambda' > \lambda$. As shown in FIG. 8, this shift in wavelength is associated with an increase in the angle of the diffracted beam that gives rise to the maximum interference from $\theta$ to $\theta'$.

Figure 9A:
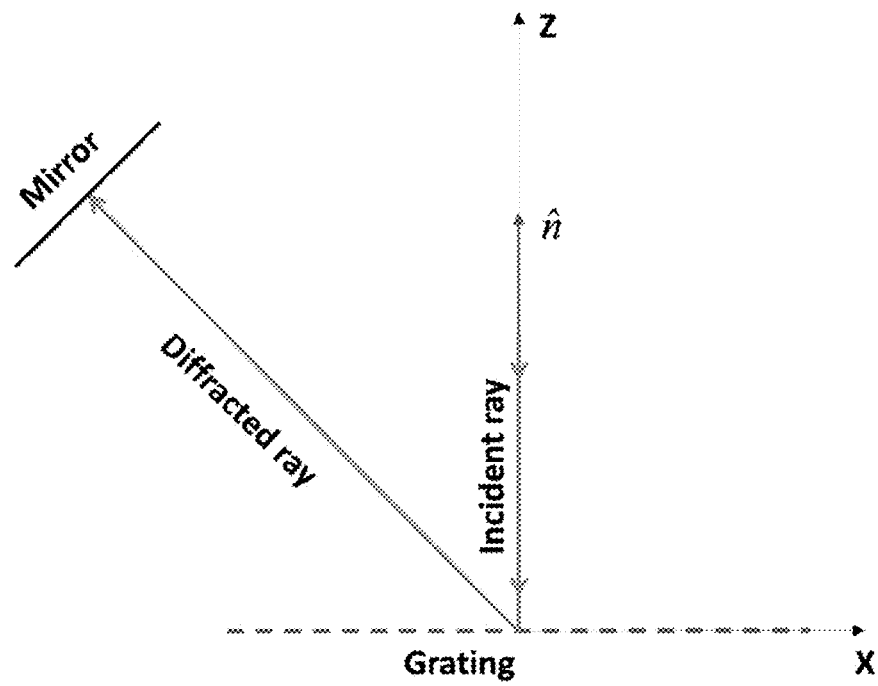
FIG. 9A is a schematic illustrating an optical beam path for an interferometric encoder system.
Figure 9B:
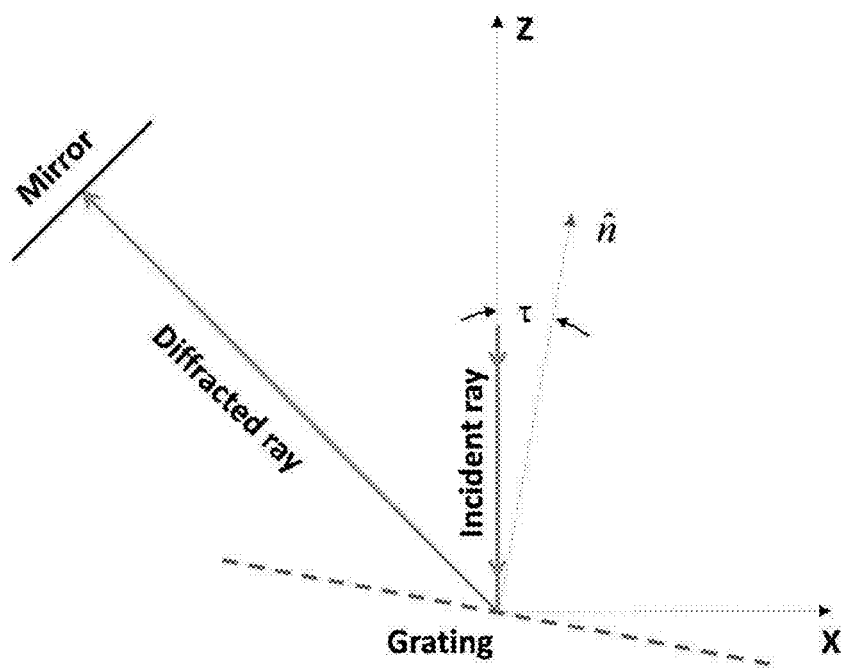
FIG. 9B is a schematic illustrating an optical beam path for an interferometric encoder system with a tilted encoder scale.

In real-world situations, encoder scale motions also include rotations as well as translations, and these rotations change the incident and diffraction angles experienced by the beams. Measuring the wavelength at the peak contrast $(\lambda_P)$ enables the determination of rotations about an axis perpendicular to the plane defined by the incident and diffracted beams if the encoder scale properties and the wavelength sweep are well known. For instance, consider the geometry and beam path shown in the schematic of FIG. 9A. The lab coordinate system is shown with the z axis vertical and the x axis horizontal. Assume first that a measurement of $\lambda_P$ is made when the encoder scale surface normal is aligned to the incident beam (which is along the z axis) and call this measurement $\bar{\lambda}_P$. Now let the grating rotate in the plane of the page about the lab origin by an angle $\tau$, with positive $\tau$ indicating a clockwise rotation (right hand plot). Since the optical assembly that provides the incident beam doesn't move, the incident beam is still aligned to the z axis, so $\tau$ represents the new angle of incidence with a sign consistent with the Richardson grating convention. The peak contrast wavelength will now occur at a wavelength for which the diffracted angle τ in the lab coordinate system doesn't change. From the beam path shown in FIG. 9B and the grating equation, the tilt angle can then be recovered by solving the transcendental equation $$\frac{m\lambda_P}{\Lambda} = \sin(\tau) + \sin\left[\sin^{-1}\left(\frac{m\bar{\lambda}_P}{\Lambda}\right) + \tau\right] \quad (17)$$

for τ. A useful approximation for small τ is;

$$\sin(\tau) = \frac{m\lambda_P + m\bar{\lambda}_P}{\Lambda\left(1 + \sqrt{1 - (\bar{\lambda}_P/\Lambda)^2}\right)}. \quad (18)$$

Assuming the optical assembly and mirror are rigidly mounted so only the encoder scale surface moves relative to this assembly, rapidly repeating these wavelength sweeps and analyzing each trace with a Fourier transform to obtain the cavity phases and wavelengths at the various contrast peaks provides all the information needed to track the motion of the encoder scale relative to the assembly. Encoder scale tilt (about the axis perpendicular to the plane containing the light beams) can be measured directly from the peak position and tracking the phase at a particular optical frequency provides a high resolution measurement of the change in the beam optical path, which is a mixture of both in-plane and out-of-plane encoder scale motion. The motions can then be separated using the equations above for the appropriate geometry. Thus, a single optical assembly/detector arrangement can be configured for 5 degrees of freedom of encoder scale motion; displacements in x, y and z and rotations about x and y.

The identification of peak contrast, whether due to different cavity OPL or reflector tilt, may be best understood using an example. Consider, for instance, a simulation of interference intensity obtained from an example encoder system geometry similar to the one shown in FIG. 4, in which the mirrors are arranged to reflect $1^{st}$ order diffracted test beams, with D=10 mm, $D_{m=+1}$=16 mm, $D_{n=-1}$=12 mm. In the simulation, the illumination is wavelength tuned over 100 nm and centered at about 1.45 μm. The encoder scale is assumed to be a grating having a period of 2.8 μm, so that the $1^{st}$ order diffracted angle at λ=1.4 μm is about 30 degrees relative to the encoder surface normal. The beam diameter given by the collimator focal length and the single mode fiber core diameter (typically about 9 μm) defines the contrast falloff as a function of angle. It is assumed that the mirrors for both the positive and negative diffraction orders are set to the same angle relative to the encoder scale surface normal, such that the diffracted test beams strike the mirrors normally when the test beam is tuned to the center wavelength.

In a first measurement using the foregoing arrangement, the encoder scale is assumed to be motionless. The graph in FIG. 10A shows the 8192 interference intensity samples that were observed for the simulated system during the 100 nm tune in which the optical frequency was linearly increased. Note the continuous interference observed throughout the trace from the $0^{th}$ order cavity. This is because the $0^{th}$ order cavity contrast is not a function of wavelength (but does depend on test grating tilt). Extra interference was observed near the center as the light from the +1 and −1 diffraction order cavities interfere. The interference for both of these cavities was confined to the neighborhood of the center wavelength (which occurs at center of the interference intensity trace shown in FIG. 10A).

By performing a Fourier transform of the intensity signal, the interference trace provides phase and interference contrast information for each of the different cavities. For example, the graph in FIG. 10B shows the power spectrum as a function of frequency in fractional Nyquist derived from a Fourier Transform of the interference intensity trace of the top graph. Six peaks are observed representing six interfering cavities. Three of the peaks correspond to the cavities discussed so far, i.e., the $0^{th}$ order cavity (interference between the reference and the grating surface), the +1 order cavity (interference between the reference and the left mirror) and the −1 order cavity (interference between the reference and the right mirror). The remaining peaks represent interference between the two test mirrors, interference between right mirror with the encoder scale, and interference between the left mirror and the encoder scale. The cavity lengths were chosen so that the six interference peaks are well separated. In particular, the narrow peak (appearing almost as a single line extending infinitely high) at frequency 0.116 is the $0^{th}$ order cavity, the peak at 0.255 is the −1 order cavity, and the +1 order cavity is at 0.302. The peaks at 0.047, 0.140, 0.186 represent interference between the two test mirrors, the test grating with the −1 order mirror and the test grating with the +1 order mirror, respectively. The phases for each cavity can be obtained from the complex Fourier coefficient at the maximum of the corresponding peak.

Figure 11A:
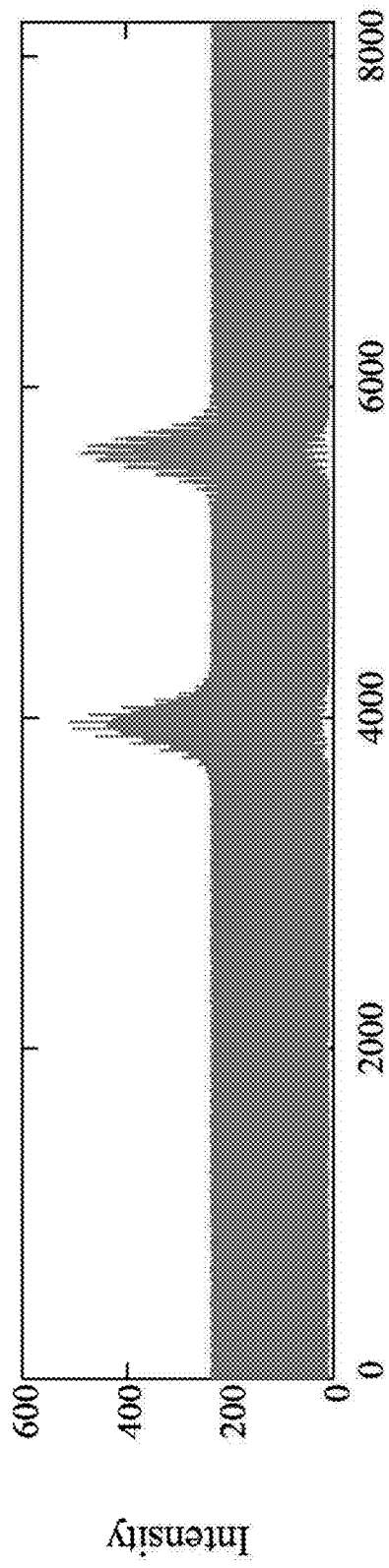
FIG. 11A illustrates a plot of intensity for an encoder system in which a wavelength of a test beam is tuned.
Figure 11B:
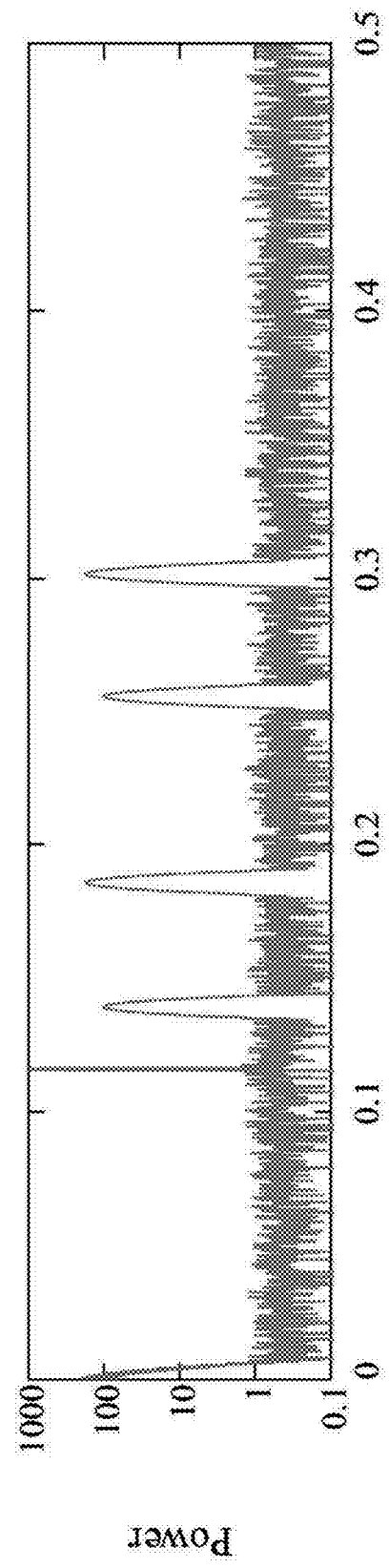
FIG. 11B illustrates a power spectrum plot in fractional Nyquist and corresponds to the Fourier transform of the plot of FIG. 11A.

FIG. 11A is a plot that shows a simulation of the interference intensity trace for the same encoder system geometry on which the plot of FIG. 10A is based, but with the mirror for the −1 order cavity tilted so that maximum interference occurs at a wavelength of 1.43 μm. As shown FIG. 11A, the interference resulting from the −1 order cavity is now displaced to approximately intensity sample 5500. Furthermore, referring to FIG. 11B, the peak representing interference between the two test mirrors (at 0.047 in FIG. 10B) in the power spectrum has disappeared since the light reflected from the two mirrors are no longer coincident. Thus, that spectral region is cleared of undesired interference signals, so that additional cavities associated with interference frequencies in that range may be added to the encoder system.

Using non-dispersive elements like plane mirrors at the cavity ends means the interference contrast is only observed for a short time as the wavelength is swept. This broadens and weakens the peaks in the Fourier domain, resulting in lowered phase resolution. Accordingly, in some situations it may be advantageous to increase the time over which good contrast interference is observed.

For example, FIG. 12A is a schematic that illustrates an example of an interferometric encoder system that relies on a lens to increase the time over which good interference is observed. As in other implementations, the system shown in FIG. 12A includes an optical assembly 1206 that directs a test beam 1212 toward an encoder scale 1210 and that receives the test beam after reflection and diffraction from the encoder scale 1210. Unlike previous implementations, however, the mirror 1220 is placed at the focal plane of an intermediate lens 1218. The positioning of the intermediate lens 1218 increases the range of diffracted beam angles that are retro-reflected and thus expands the range of wavelengths that produce good quality interference.

FIG. 12B is a schematic that illustrates an example of an interferometric encoder system that relies on a secondary diffraction grating 1222 to increase the time over which good interference is observed. The grating 1222 operates in transmission, with a grating period approximately equal to the period of the encoder scale 1210 so that the beams (1214, 1216) are redirected toward mirror 1224. Similar to FIG. 12A, the arrangement shown in FIG. 12B also increases the range of diffracted beam angles that result in good contrast interference recorded at the detector module by compensating for the dispersion of the encoder scale 1210, and therefore expands the range of wavelengths that produce the desired retro-reflection.

FIG. 12C is a schematic that illustrates another example of an interferometric encoder system that relies on a secondary diffraction grating 1226 to compensate for the encoder scale dispersion and therefore increase the time over which good interference is observed during the sweep. In the implementation of FIG. 12C, the diffraction grating 1226 operates in a reflective Littrow condition with a grating period approximately equal to half the period of the encoder scale 1210 so that the beams (1214, 1216) are reflected back toward encoder scale 1210. Similar to the implementations shown in FIGS. 12A-12B, the arrangement of FIG. 12C also increases the range of diffracted beam angles that are retro-reflected and hence provides good interference contrast recorded at the detector module over an extended range of wavelengths.

Figures 13A, 13B:
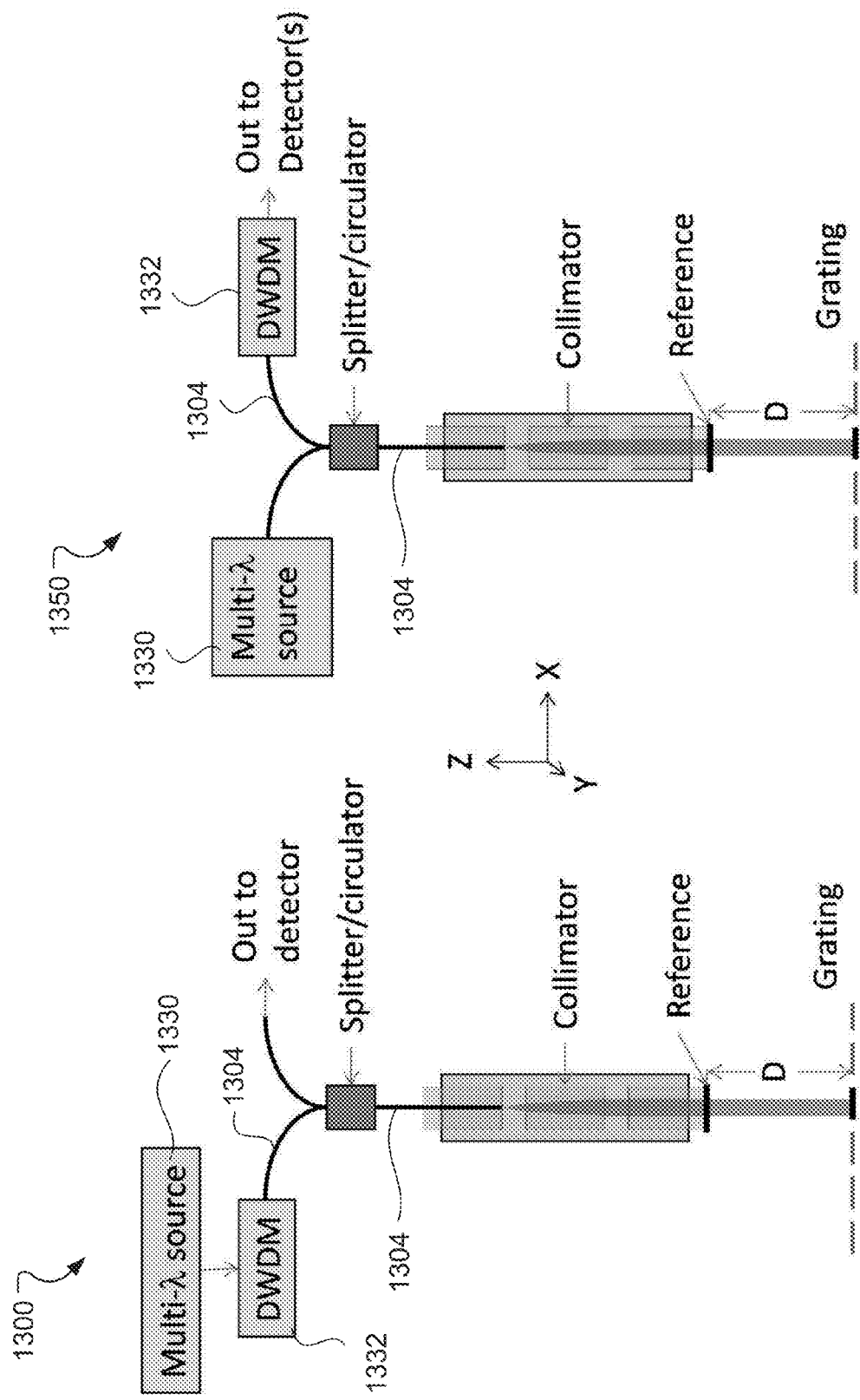
FIGS. 13A-13B are schematics that illustrate examples of discrete wavelength sampling.

While the variation in wavelength may be implemented by continuously scanning the optical frequency/wavelength of the source over time, a continuous scan is not necessary. Instead, a source consisting of many discrete wavelengths may be used, with the discrete wavelengths sequentially selected and the interference sampled at each discrete wavelength. FIGS. 13A-13B are schematics that illustrate two alternative implementations of an encoder system that rely on discrete sampling of the output beam at different wavelengths. Each configuration relies on a wavelength filter (in this case a dense-wavelength-division-multiplexer (DWDM)) so that one discrete wavelength is sampled at a time. The DWDM in each configuration may be coupled to the electronic processor (not shown) that is operable to control which wavelengths of light are selected by the DWDM. FIG. 13A shows an encoder system 1300 having a multi-wavelength source 1330 (e.g., a spectrally broad-band optical source) whose discrete wavelengths are selected one at a time using a DWDM 1332 that is coupled to optical fiber 1304 upstream of the optical assembly (i.e., before the input beam is separated into test and reference beams). The interference of the output beam is sampled using a single high speed detector in the detector module.

FIG. 13B shows an alternative configuration of encoder system 1350, in which the DWDM 1332 is coupled to the optical fiber 1304 downstream of the optical assembly (i.e., after the diffracted test beam and reference beam combine). In contrast to the implementation shown in FIG. 13A, the DWDM 1332 may be configured to discretely sample multiple wavelengths of the output beam either one at a time or at the same time. If multiple wavelengths of the output beam are sampled at the same time, each sampled output beam may be delivered from the DWDM 1332 to a single detector or separate corresponding detectors. Thus, the implementation in FIG. 13B has the advantage of speed over the implementation shown in FIG. 13A due to simultaneous sampling. The implementation in FIG. 13B may also entail greater complexity due to the use of multiple detectors.

In some implementations, the optical source may include an arrangement of multiple individually selectable narrow band sources. The sources may be energized one at a time and, for each energized source, the output interference may be sampled.

Figure 14:
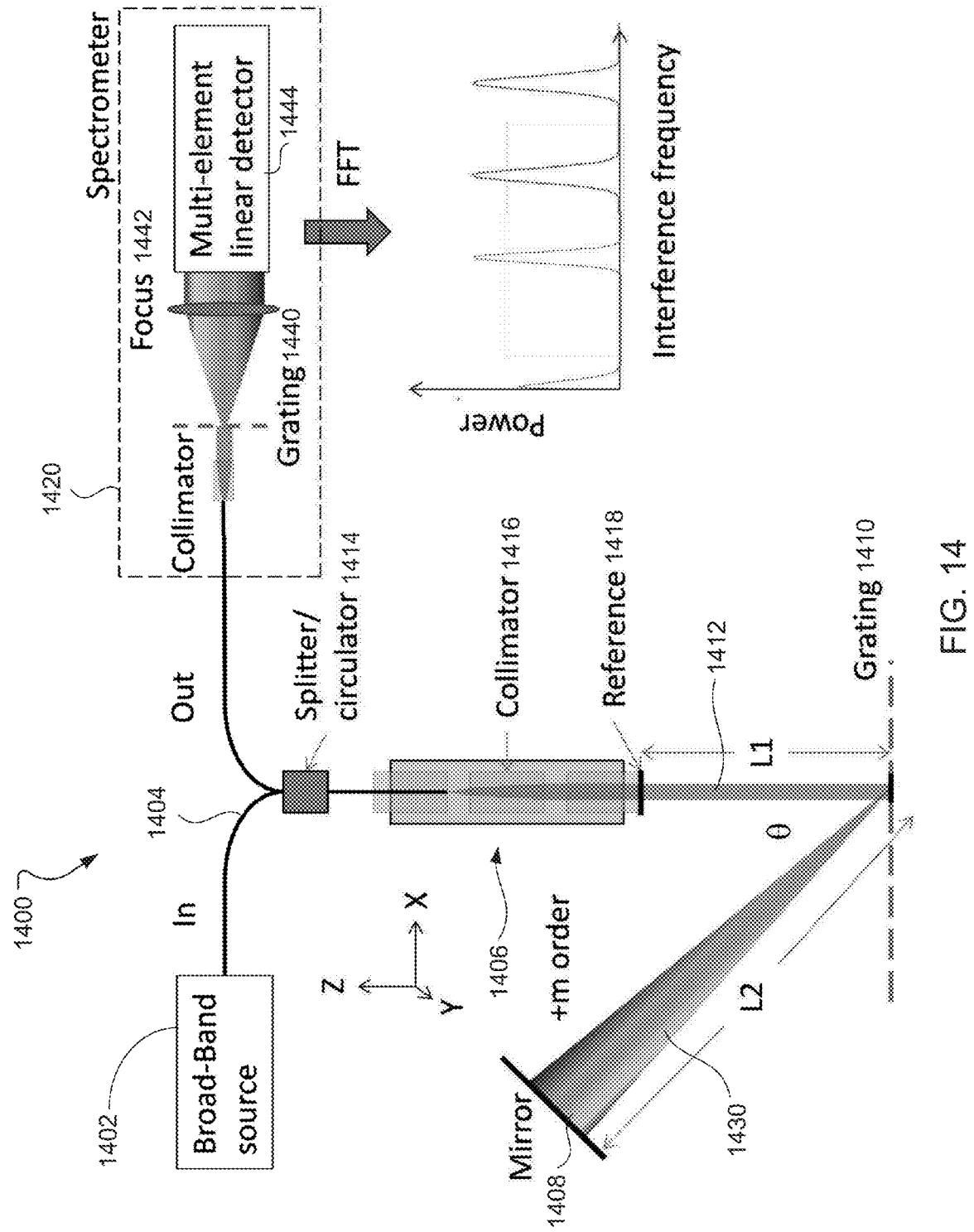
FIG. 14 is a schematic illustrating an example of an interferometric encoder system.

In some implementations, a spectrally broad-band source (e.g., a white light source) is used as the optical source module and, instead of tuning the wavelength, a broad range of wavelengths are used simultaneously. FIG. 14 is a schematic that illustrates an example of an interferometric encoder system 1400 in which the output interference is obtained by simultaneously directing multiple wavelengths from a broad-band source 1402 at an encoder scale 1410. Illumination from source 1402 is fed through an optical fiber 1404 to a collimator assembly 1406 and directed toward the encoder scale 1410. The encoder scale 1410 diffracts the light into multiple diffraction orders, some of which are redirected back to the assembly 1406, where they are recoupled into the fiber 1404. For example, the $0^{th}$ order diffraction travels directly back to the assembly 1406. In addition, the non-zero diffraction orders spectrally spread out (see spectrum 1430) toward the mirror 1408, where at least some of the diffracted components are reflected back toward the encoder scale 1410 (i.e., those spectral components that strike the mirror at normal incidence or close to normal incidence) and redirected to the assembly 1406.

Similar to the system 300 and to a first order approximation, three optical cavities are formed: a Reference-Grating (RG) cavity, a Reference-Mirror (RM) cavity and a Grating-Mirror (GM) cavity. The light that is recoupled back into the fiber 1404 passes through a splitter/circulator 1414 to a spectrometer assembly/detector module 1420. The spectrometer assembly 1420 includes an optic for collimating the light, a grating (or other dispersive element) 1440 for receiving the collimated light and for spatially separating the wavelength spectrum of the collimated light, an optical element 1442 for directing the light to a multi-element detector 1444, and the multi-element detector 1444. Each detector element receives a small spectral component, but each component is acquired simultaneously by the detector 1444. Subsequently, the signals from each element are processed by an electronic processor (not shown) that is coupled to the detector 1444 to recover the amplitude and phase of the various spectral components. The width of the spectral component intercepted by each element is preferably narrow enough so that appropriate contrast interference is observed as a result of all the desired cavities. The dispersive properties of the resolving grating and the number of detector elements to be used therefore depend on the desired contrast interference and width of the spectral components. Other types of spectrometers also may be used. For example, the detector module 1420 may include a scanning type spectrometer such as a filter wheel, tunable Fabry-Perot cavity, or a grating having tilting optics. In some implementations, the detector module 1420 may include passive spectrometers, such as the one shown in FIG. 14, but with different dispersive elements (e.g., refractive wedge) and focusing optics.

If it is assumed that each detector element of the multi-element detector 1444 detects a sufficiently narrow spectral component so that appropriate contrast is observed in the $1^{st}$ order cavities, a simultaneous analysis of the intensities acquired by the array of detector elements may provide the same information that would be available by sweeping the wavelength over the same spectral range. For example, after applying a Fourier Transform to the signal detected at the detector module, one may observe peaks at different frequencies for each cavity such as shown in the inset of FIG. 14. However, since the signal from each detector element is acquired simultaneously, the system 1400 may be less sensitive to cavity motions that can occur during a wavelength sweep. Though this scheme has the disadvantage of potentially requiring a more complicated detection system, the reduced cavity motion sensitivity may be a desirable advantage depending on the applications for which the system 1400 may be used.

Other implementations of the systems and techniques described herein are also possible. For example, in some implementations, an interferometric encoder system may include multiple optical assemblies, in which the optical assemblies are similar, in construction and arrangement with respect to an encoder scale, to the assemblies described herein. Each assembly may have a corresponding output fiber and the output fibers of the multiple assemblies may be arranged in a line. Moreover, the system may include a dispersive element (e.g., a grating or refractive wedge) and corresponding optical element (e.g., a lens) arranged to receive the light output (i.e., reference and diffracted measurement beams) from each output fiber. The dispersive element and corresponding optical element may be configured to cause the received light spectrally spread along a direction orthogonal to the direction in which the fibers are aligned. The spectrally spread output beams then may be directed toward an areal detector (e.g., a charge-coupled detector or complementary metal-oxide semiconductor camera chip). The intensity pattern recorded by the detector would then correspond to wavelengths in one dimension and a different optical assembly in the other orthogonal dimension.

In some implementations, the interferometric encoder systems described herein may include one or more reference optical sources (e.g., a reference wavelength laser source) instead of deriving the test and reference beams from the same optical source. Providing reference beams from independent sources may be particularly useful with the "instantaneous" spectrometer arrangement shown in FIG. 14 since the reference beams could be used to calibrate the spectrometer.

In general, any of the analysis methods described above, including determining information about a degree of freedom of the encoder scales, can be implemented in computer hardware or software, or a combination of both. For example, in some implementations, the electronic processor that is coupled to the detector in the various implementations described herein can be installed in a computer and configured to perform analysis of signals obtained from the detector modules. Analysis can be implemented in computer programs using standard programming techniques following the methods described herein. Program code is applied to input data (e.g., interferometric phase information) to perform the functions described herein and generate output information (e.g., degree of freedom information). The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

Lithography Tool Applications

Lithography tools are especially useful in lithography applications used in fabricating large scale integrated circuits such as computer chips and the like. Lithography is the key technology driver for the semiconductor manufacturing industry. Overlay improvement is one of the five most difficult challenges down to and below 16 nm line widths (design rules), see, for example, the *International Technology Roadmap for Semiconductors*, (2010 Update).

Overlay depends directly on the performance, i.e., accuracy and precision, of the metrology system used to position the wafer and reticle (or mask) stages. Since a lithography tool may produce $50-100M/year of product, the economic value from improved metrology systems is substantial. Each 1% increase in yield of the lithography tool results in approximately $1 M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer. In certain lithography tools, e.g., lithography scanners, the mask is also positioned on a translatable stage that is moved in concert with the wafer during exposure.

Encoder systems, such as those discussed previously, are important components of the positioning mechanisms that control the position of the wafer and reticle, and register the reticle image on the wafer. If such encoder systems include the features described above, the accuracy of distances measured by the systems can be increased and/or maintained over longer periods without offline maintenance, resulting in higher throughput due to increased yields and less tool downtime.

In general, the lithography tool, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Encoder systems described above can be used to precisely measure the positions of each of the wafer stage and mask stage relative to other components of the exposure system, such as the lens assembly, radiation source, or support structure. In such cases, the encoder system's optical assembly can be attached to a stationary structure and the encoder scale attached to a movable element such as one of the mask and wafer stages. Alternatively, the situation can be reversed, with the optical assembly attached to a movable object and the encoder scale attached to a stationary object.

More generally, such encoder systems can be used to measure the position of any one component of the exposure system relative to any other component of the exposure system, in which the optical assembly is attached to, or supported by, one of the components and the encoder scale is attached, or is supported by the other of the components.

Figure 15:
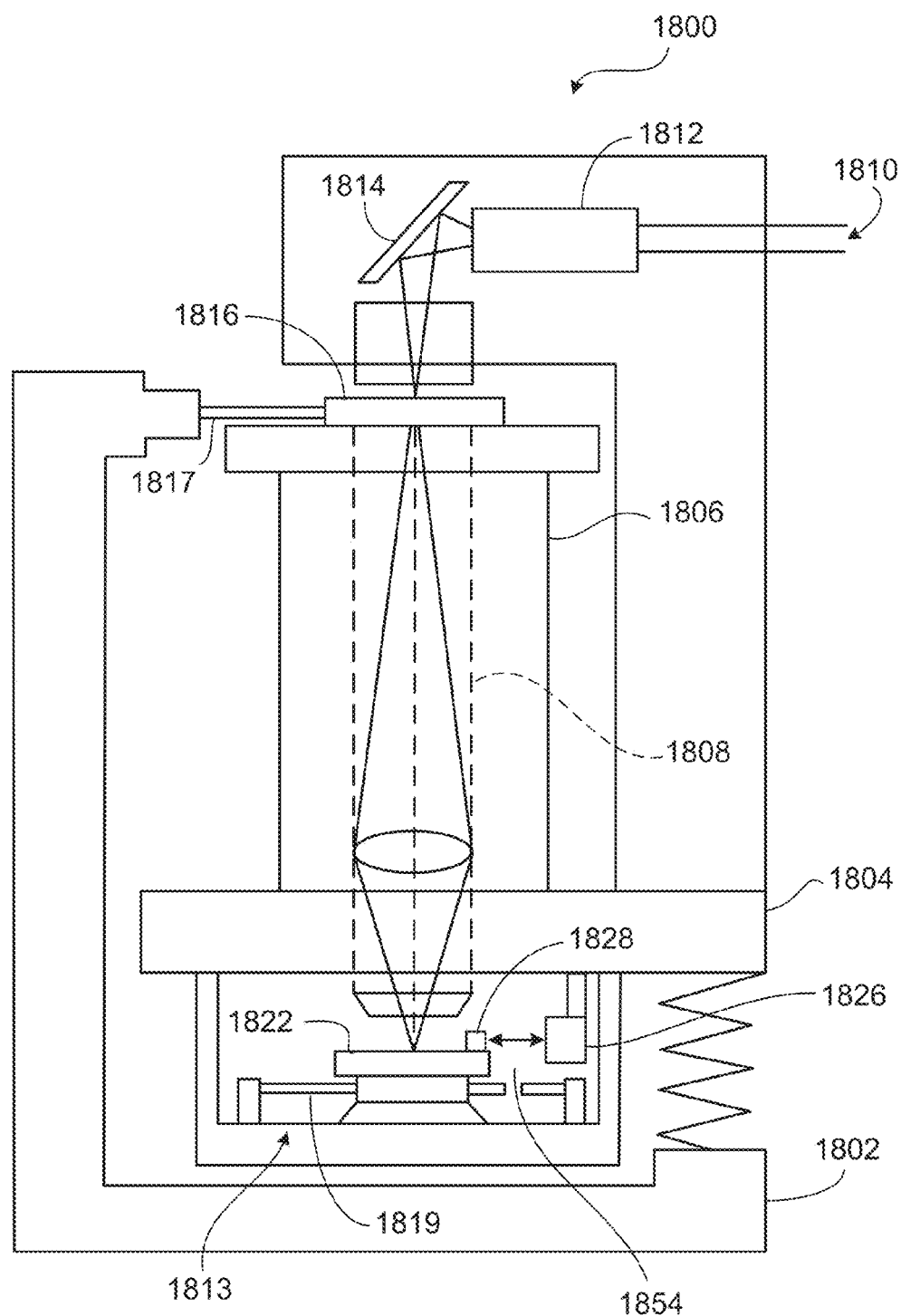
FIG. 15 is a schematic diagram of an implementation of a lithography tool that includes an interferometer.

An example of a lithography tool 1800 using an interferometry system 1826 is shown in FIG. 15. The encoder system is used to precisely measure the position of a wafer (not shown) within an exposure system. Here, stage 1822 is used to position and support the wafer relative to an exposure station. Scanner 1800 includes a frame 1802, which carries other support structures and various components carried on those structures. An exposure base 1804 has mounted on top of it a lens housing 1806 atop of which is mounted a reticle or mask stage 1816, which is used to support a reticle or mask. A positioning system for positioning the mask relative to the exposure station is indicated schematically by element 1817. Positioning system 1817 can include, e.g., piezoelectric transducer elements and corresponding control electronics. Although it is not included in this described implementation, one or more of the encoder systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1804 is a support base 1813 that carries wafer stage 1822. Stage 1822 includes a measurement object 1828 for diffracting a measurement beam 1854 directed to the stage by optical assembly 1826. A positioning system for positioning stage 1822 relative to optical assembly 1826 is indicated schematically by element 1819. Positioning system 1819 can include, e.g., piezoelectric transducer elements and corresponding control electronics. The measurement object diffracts the measurement beam reflects back to the optical assembly, which is mounted on exposure base 1804. The encoder system can be any of the implementations described previously.

During operation, a radiation beam 1810, e.g., an ultraviolet (UV) beam from a UV laser (not shown), passes through a beam shaping optics assembly 1812 and travels downward after reflecting from mirror 1814. Thereafter, the radiation beam passes through a mask (not shown) carried by mask stage 1816. The mask (not shown) is imaged onto a wafer (not shown) on wafer stage 1822 via a lens assembly 1808 carried in a lens housing 1806. Base 1804 and the various components supported by it are isolated from environmental vibrations by a damping system depicted by spring 1820.

In some implementations, one or more of the encoder systems described previously can be used to measure displacement along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In certain implementations, the optical assembly 1826 can be positioned to measure changes in the position of reticle (or mask) stage 1816 or other movable components of the scanner system. Finally, the encoder systems can be used in a similar fashion with lithography systems involving steppers, in addition to, or rather than, scanners.

Figure 16A:
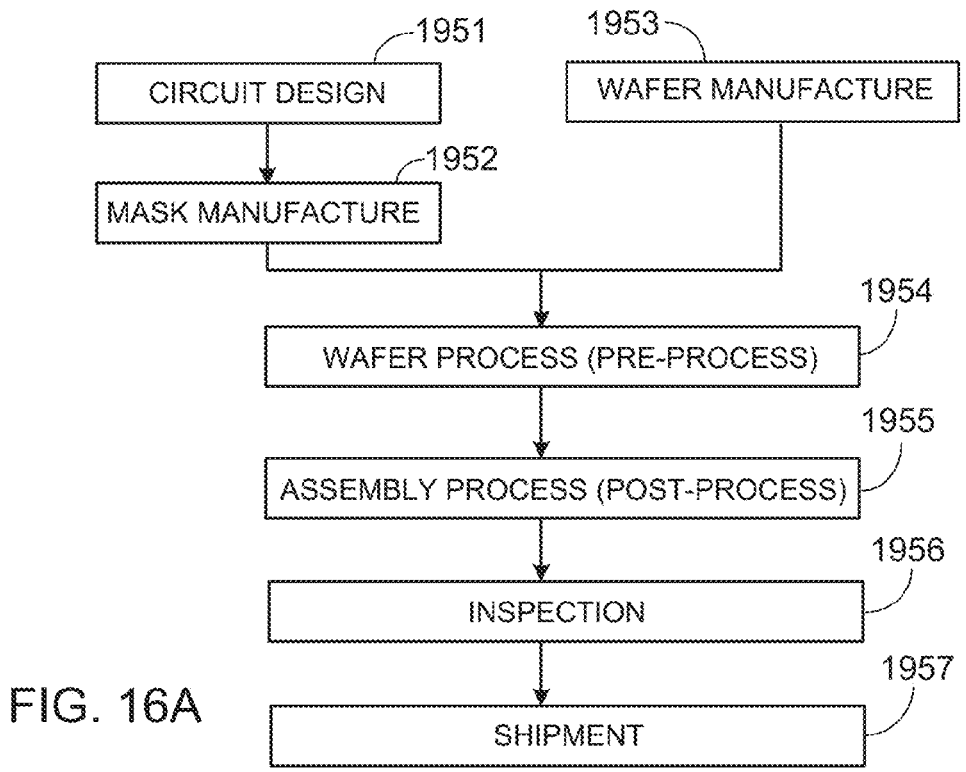
FIG. 16A and FIG. 16B are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 16A and 16B. FIG. 16A is a flow chart of the sequence of manufacturing a semiconductor device such as a semiconductor chip (e.g., IC or LSI), a liquid crystal panel or a CCD. Step 1951 is a design process for designing the circuit of a semiconductor device. Step 1952 is a process for manufacturing a mask on the basis of the circuit pattern design. Step 1953 is a process for manufacturing a wafer by using a material such as silicon.

Step 1954 is a wafer process that is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1955 is an assembling step, which is called a post-process wherein the wafer processed by step 1954 is formed into semiconductor chips. This step includes assembling (dicing and bonding) and packaging (chip sealing). Step 1956 is an inspection step wherein operability check, durability check and so on of the semiconductor devices produced by step 1955 are carried out. With these processes, semiconductor devices are finished and they are shipped (step 1957).

Figure 16B:
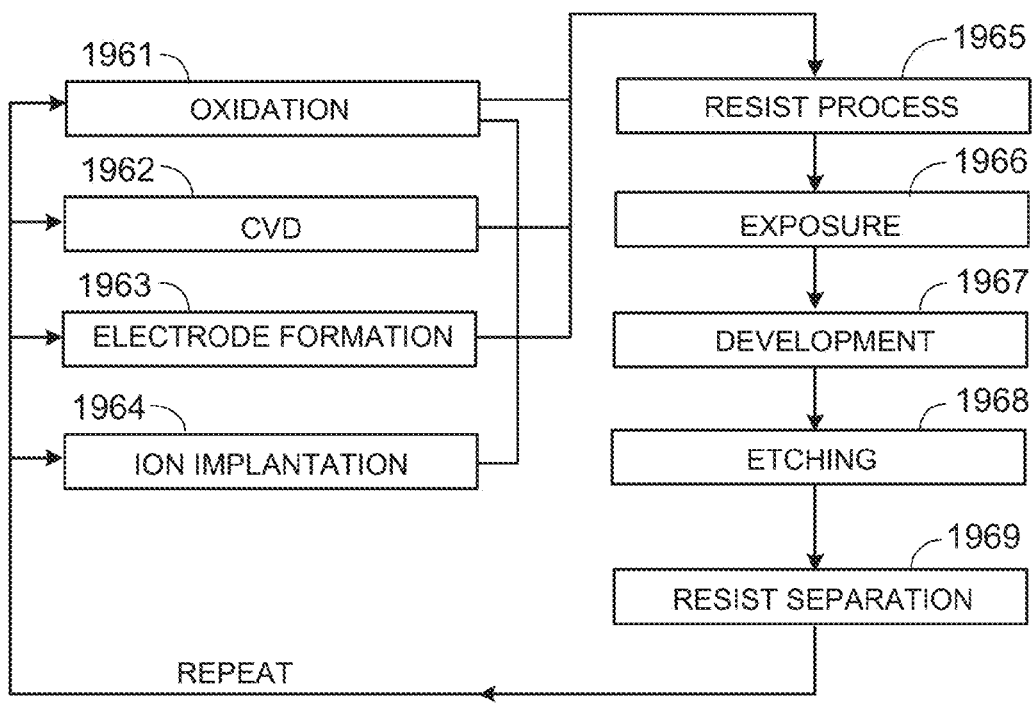

FIG. 16B is a flow chart showing details of the wafer process. Step 1961 is an oxidation process for oxidizing the surface of a wafer. Step 1962 is a CVD process for forming an insulating film on the wafer surface. Step 1963 is an electrode forming process for forming electrodes on the wafer by vapor deposition. Step 1964 is an ion implanting process for implanting ions to the wafer. Step 1965 is a resist process for applying a resist (photosensitive material) to the wafer. Step 1966 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1967 is a developing process for developing the exposed wafer. Step 1968 is an etching process for removing portions other than the developed resist image. Step 1969 is a resist separation process for separating the resist material remaining on the wafer after being subjected to the etching process. By repeating these processes, circuit patterns are formed and superimposed on the wafer.

The encoder systems described above can also be used in other applications in which the relative position of an object needs to be measured precisely. For example, in applications in which a write beam such as a laser, x-ray, ion, or electron beam, marks a pattern onto a substrate as either the substrate or beam moves, the encoder systems can be used to measure the relative movement between the substrate and write beam.

A number of implementations have been described. Nevertheless, it will be understood that various modifications may be made without departing from the spirit and scope of the invention. Accordingly, other implementations are within the scope of the following claims.

What is claimed is:

1. A method for determining information about a degree of freedom of rigid body motion of an encoder scale, the method comprising:
    directing a first beam and a second beam along different paths, wherein the first beam diffracts from an encoder scale;
    combining a diffracted component of the first beam with the second beam to form an interfering output beam;
    varying a wavelength of the first and second beams;
    monitoring the interference in the output beam as a function of the wavelength of the first and second beams; and
    determining the information about a degree of freedom of rigid body motion of the encoder scale based on changes in the output beam as a function of the wavelength.

2. The method of claim 1, wherein determining the information about the degree of freedom of the encoder scale comprises determining an absolute distance between a reference surface and the encoder scale.

3. The method of claim 1, wherein monitoring the output beam comprises determining one or more wavelengths at which a contrast of the output beam in the optical frequency domain is a local maximum.

4. The method of claim 3, wherein the encoder scale comprises a grating and wherein the one or more wavelengths comprise the Littrow wavelength $\lambda L$.

5. The method of claim 3, wherein the encoder scale is at a fixed position while the wavelength is varied.

6. The method of claim 5, further comprising:
    varying a position of the encoder scale;
    determining a change in the interference phase of the output beam as a function of the change in encoder scale position at least at one of the one or more wavelengths corresponding to a local maximum contrast in the optical frequency domain, wherein determining the information about a degree of freedom of rigid body motion of the encoder scale further comprises determining information about a relative change in position of the encoder scale based on the change in interference phase.

7. The method of claim 6, wherein the information about the relative change in position of the encoder scale comprises information about a relative displacement of the encoder scale along a direction parallel to the surface normal of the encoder scale and/or information about a relative displacement of the encoder scale along a first direction orthogonal to the surface normal of the encoder scale.

8. The method of claim 1, wherein the diffracted component of the first beam comprises a component that is once-diffracted from the encoder scale.

9. The method of claim 1, wherein the diffracted component of the first beam that is combined with the second beam comprises a first beam component that is once-diffracted by the encoder scale and a second beam component that is at least twice-diffracted from the encoder scale.

10. The method of claim 9, wherein an optical path length (OPL) corresponding to the space traversed by the first beam component is different from an OPL corresponding to the space traversed by the second beam component.

11. The method of claim 1, wherein the diffracted component comprises:
    a first component that has been reflected from a first mirror and twice-diffracted by the encoder scale along a first plane;
    a second component that has been reflected from a second mirror and twice-diffracted by the encoder scale along a second plane; and
    a third component that has been once-diffracted by the encoder scale.

12. The method of claim 1, wherein a beam path of the first beam is oriented parallel with respect to a surface normal of the encoder scale, and wherein the diffracted component comprises:
    a first component that has been reflected from a first mirror and twice-diffracted by the encoder scale along a first plane, wherein a path of the first component between the encoder scale and the first mirror corresponds to an $m^{th}$ order of diffraction, wherein $|m| \geq 1$; and
    a second component that has been reflected from a second mirror and twice-diffracted by the encoder scale along the first plane, wherein a path of the second component between the encoder scale and the second mirror corresponds to an nth order of diffraction, wherein $|n| \geq 1$.

13. The method of claim 1, wherein the diffracted component comprises:
    a first component that has been reflected from a mirror and twice-diffracted by the encoder scale, wherein a path of the first component between the encoder scale and the first mirror corresponds to an $m^{th}$ order of diffraction; and
    a second component that has been reflected from the mirror and twice-diffracted by the encoder scale, wherein a path of the second component between the encoder scale and the second mirror corresponds to an nth order of diffraction, wherein n ≠m.

14. The method of claim 1, wherein the diffracted component comprises:
    a first component that has been twice-diffracted by the encoder scale and diffracted by a separate reflective grating, wherein a path of the first component between the reflective grating and the encoder scale corresponds to an $m^{th}$ order of diffraction; and a second component that has been twice-diffracted by the encoder scale and diffracted by the reflective grating, wherein a path of the second component between the reflective grating and the encoder scale corresponds to an $n^{th}$ order of diffraction, wherein n ≠m.

15. An encoder system comprising:
a light source operable to produce an input light beam;
an encoder scale;
an optical assembly arranged to:
  receive the input light from the optical source and derive, from the input light beam, a first beam,
  direct the first beam toward the encoder scale, such that the first beam diffracts from the encoder scale, and
  combine a diffracted component of the first beam with a second beam to form an output beam;
a detector arranged to detect the output beam; and
an electronic processor coupled to the detector, wherein the processor is configured to:
  monitor changes in the output beam as a function of wavelength of the first beam, and
  determine information about a degree of freedom of rigid body motion of the encoder scale based on the changes in the output beam as a function of a wavelength of the first beam, wherein (1) the light source comprises a tunable light source, and the electronic processor is configured to vary a wavelength of the input light beam produced by the tunable light source or (2) wherein the light source comprises a multi-wavelength source and an adjustable wavelength filter, and the electronic processor is configured to alter the wavelength of the filter applied to the input light beam produced by the light source.

16. The system of claim 15, wherein the information about a degree of freedom of rigid body motion of the encoder scale comprises an absolute distance between the optical assembly and the encoder scale.

17. The system of claim 15, wherein the electronic processor is configured to determine one or more wavelengths of the first beam at which a peak contrast of the output beam in the optical frequency domain is a local maximum.

18. The system of claim 15, wherein the optical assembly comprises:
a collimator arranged to receive the input light and output a collimated input beam; and
an optical element configured to partially reflect the collimated input beam into the second beam and partially transmit the collimated input beam as the first beam.

19. The system of claim 15, further comprising a first mirror arranged to redirect a first beam component of the first beam that is diffracted from the encoder scale.

20. The system of claim 19, further comprising a second mirror arranged to redirect a second beam component of the first beam that is diffracted from the encoder scale.

21. The system of claim 19, further comprising a lens arranged in the beam path of the first portion of the first beam between the mirror and the encoder scale, wherein the mirror is located at a focal plane of the lens.

22. The system of claim 15, further comprising a grating structure arranged to receive and redirect back to the encoder scale a first portion of the first beam that is diffracted from the encoder scale.

23. The system of claim 15, further comprising a reference light source to generate the second beam.

24. The system of claim 15, further comprising a dispersive optical element arranged to receive the output beam and configured to spatially separate the wavelength spectrum of the output beam.

* * * * *